(12) United States Patent
Choi

(10) Patent No.: US 11,985,696 B2
(45) Date of Patent: May 14, 2024

(54) APPARATUS AND METHOD FOR PERFORMING RANDOM ACCESS

(71) Applicant: UUCOM CO., LTD, Gyeonggi-do (KR)

(72) Inventor: Su Han Choi, Gwacheon-si (KR)

(73) Assignee: UUCOM CO., LTD, Gwacheon (KR)

( * ) Notice: Subject to any disclaimer, the term of this patent is extended or adjusted under 35 U.S.C. 154(b) by 62 days.

(21) Appl. No.: 17/926,124

(22) PCT Filed: May 26, 2021

(86) PCT No.: PCT/KR2021/095053
§ 371 (c)(1),
(2) Date: Nov. 17, 2022

(87) PCT Pub. No.: WO2021/246848
PCT Pub. Date: Dec. 9, 2021

(65) Prior Publication Data
US 2023/0180287 A1  Jun. 8, 2023

(30) Foreign Application Priority Data

Jun. 3, 2020 (KR) .................. 10-2020-0066830
Jun. 9, 2020 (KR) .................. 10-2020-0069681
(Continued)

(51) Int. Cl.
*H04W 4/00* (2018.01)
*H04W 74/00* (2009.01)
(Continued)

(52) U.S. Cl.
CPC ..... *H04W 74/002* (2013.01); *H04W 74/0833* (2013.01); *H04W 56/0015* (2013.01); *H04W 84/06* (2013.01)

(58) Field of Classification Search
CPC ........... H04W 74/002; H04W 74/0833; H04W 56/0015; H04W 84/06; H04W 56/0045; H04W 74/006; H04B 7/18563
See application file for complete search history.

(56) References Cited

U.S. PATENT DOCUMENTS

2008/0232304 A1* 9/2008 Mooney ............ H04W 74/0875
455/452.2
2018/0270869 A1* 9/2018 Tsai ..................... H04W 74/006
(Continued)

FOREIGN PATENT DOCUMENTS

CA  3030518 C  *  9/2020  ............. H04B 7/024
EP  4090123 A1  * 11/2022  ........ H04W 74/0833
(Continued)

OTHER PUBLICATIONS

International Search Report dated Sep. 3, 2021 in International Patent Application No. PCT/KR2021/095053.
(Continued)

*Primary Examiner* — Thai D Hoang
(74) *Attorney, Agent, or Firm* — Insight Law Group, PLLC; Seung Lee

(57) ABSTRACT

The present specification relates to an apparatus and method for performing random access. This specification discloses a method for performing random access by a terminal in a non-terrestrial network system, the method comprising the steps of: performing a search for a cell of a non-terrestrial network on the basis of a synchronization signal block transmitted from a non-terrestrial network node; after the search for the cell is completed, receiving, from the non-terrestrial network node, random access-related information about the cell of the non-terrestrial network; generating a random access preamble on the basis of a frequency resource area of a random access channel related to the cell of the non-terrestrial network; and transmitting the gener-
(Continued)

ated random access preamble to the non-terrestrial network node. Performance degradation can be reduced when random access is performed in a non-terrestrial network system.

14 Claims, 14 Drawing Sheets

(30) Foreign Application Priority Data

May 14, 2021 (KR) .......................... 10-2021-0062704
May 14, 2021 (KR) .......................... 10-2021-0062706

(51) Int. Cl.
*H04W 74/0833* (2024.01)
*H04W 56/00* (2009.01)
*H04W 84/06* (2009.01)

(56) References Cited

U.S. PATENT DOCUMENTS

| | | | |
|---|---|---|---|
| 2018/0324641 A1* | 11/2018 | Tsai | H04W 28/065 |
| 2019/0182870 A1* | 6/2019 | Shih | H04W 16/32 |
| 2019/0230712 A1* | 7/2019 | Ou | H04W 74/0833 |
| 2023/0180287 A1* | 6/2023 | Choi | H04W 74/0833 |
| | | | 370/329 |

FOREIGN PATENT DOCUMENTS

| | | |
|---|---|---|
| KR | 10-2018-0039567 | 4/2018 |
| KR | 1020180090882 | 8/2018 |
| KR | 1020180124033 | 11/2018 |
| KR | 1020190018170 | 2/2019 |
| WO | WO-2022083880 A1 * | 4/2022 |

OTHER PUBLICATIONS

Written Opinion of the International Searching Authority dated Sep. 3, 2021 in International Patent Application No. PCT/KR2021/095053.
3rd Generation Partnership Project; Technical Specification Group Radio Access Network; Solutions for NR to support non-terrestrial networks (NTN) (Release 16)', 3GPP TR 38.821 V16.0.0, Jan. 16, 2020.
Interdigital, 'On Initial Access and RACH Procedures for NTN', R1-1904858, 3GPP TSG RAN WG1 #96bis, Xi'an, China, Mar. 30, 2019.
Samsung, 'Uplink timing advance/RACH procedure and Initial Access for NTN', R1-1912470, 3GPP TSG RAN WG1 #99, Reno, USA, Nov. 8, 2019.
Harri Saarnisaari, et al., 'Random Access Process Analysis of 5G New Radio Based Satellite Links', 2019 IEEE 2nd 5G World Forum (5GWF), 2019, DOI:10.1109/5GWF.2019.8911737 [Retrieved on Jun. 30, 2021]. Retrieved from the Internet: <URL: http://jultika.oulu.fi/files/nbnfi-fe2019120545778.pdf>.
Zte, et al., 'Random Access Procedure and RACH Capacity in NTN', R2-1908246, 3GPP TSG RAN WG2 #106, Reno, USA, May 18, 2019.

* cited by examiner

APPARATUS AND METHOD FOR PERFORMING RANDOM ACCESS

CROSS-REFERENCE TO RELATED APPLICATIONS

This application claims the benefit of priority of Korean Patent Application No. 10-2020-0066830 filed on Jun. 3, 2020, Korean Patent Application No. 10-2020-0069681 filed on Jun. 9, 2020, Korean Patent Application No. 10-2021-0062704 filed on May 14, 2021, and Korean Patent Application No. 10-2021-0062706 filed on May 14, 2021 which are incorporated by reference in their entirety herein.

FIELD OF THE INVENTION

The present invention relates to a wireless communication system, and more particularly, to an apparatus and method for performing random access.

RELATED ART

3GPP paved the way for commercial application of 5G by completing the first global 5G New Radio (NR) standard in Release (Rel)-15. NR is radio access technology for providing an improved data rate compared to LTE and satisfying various QoS requirements for each segmented and detailed usage scenario. In particular, enhancement mobile broadband (eMBB), massive MTC (mMTC), and ultra-reliable and low latency communications (URLLC) have been defined as representative usage scenarios of NR. As a method for satisfying requirements for each scenario, a frame structure that is flexible compared to LTE is provided.

In addition, NR-based non-terrestrial network (NTN) is being considered as one of evolutionary stages of NR for activation of 5G and ecosystem expansion. Due to wide service coverage capabilities of NTN and reduced vulnerability of space/air platforms to physical attacks and natural disasters, NTN can provide 5G services in areas where services of terrestrial 5G networks are not provided (isolated or remote areas, on board aircraft or ships) and areas with poor service (suburbs or rural areas) in a cost-effective manner. It also provides continuity of service to M2M, IoT devices or passengers on mobile platforms (aircrafts, ships, high-speed trains, buses, etc.) or makes it possible to support highly reliable 5G services that can be used anywhere for major communications such as rail, sea, and air communications in the future. In addition, it is possible to support availability of 5G networks by providing efficient multicast/broadcast resources for data delivery to network edges or user terminals. These benefits can be provided through a standalone NTN or an integrated network of ground and non-terrestrial networks, and are expected to have an impact in transport, public safety, media and entertainment, eHealth, energy, agriculture, finance, and automotive fields.

Additionally, network slicing technology is being considered. The network slicing technology is a new concept applied to 5G mobile communications which provides network resources and network functions for each service by creating and providing end-to-end (E2E) resources spanning a radio access network (RAN) to a core network as one independent slice, thereby applying attributes such as isolation, customization, and independent management and orchestration to the RAN and the core network of mobile communications.

Communication technology is being developed in a way of being combined with the development of technologies such as network function virtualization (NFV) and a software defined network (SDN) to configure a network slice optimized for application characteristics for each application in one huge network.

Network slicing is technology for creating a logically separated network with End-to-End (E2E) in a UE including radio access, transmission, and 5G core equipment through one physical network and providing a dedicated network specialized for a service for various services having different characteristics. That is, network slicing is technology for providing network resources and network functions necessary for a service requested by a UE by making them as one independent slice.

SUMMARY

Technical Problem

An object of the present invention is to provide an apparatus and method for performing random access in a non-terrestrial network system.

Another object of the present invention is to provide an apparatus and method for performing random access based on network slicing.

Technical Solution

According to an aspect of the present invention, there is provided a method of performing initial access by a UE in a non-terrestrial network system. The method includes searching a cell of a non-terrestrial network based on a synchronization signal block (SSB) transmitted from a non-terrestrial network node, receiving, from the non-terrestrial network node, random access (RA) related information about the cell of the non-terrestrial network after the cell search is completed, generating an RA preamble based on a frequency resource region of an RA channel regarding the cell of the non-terrestrial network, and transmitting the generated RA preamble to the non-terrestrial network node. Here, the RA related information includes first offset information indicating a start point of a frequency resource region of an RA channel regarding a cell of a terrestrial network, and a second offset indicating a start point of the frequency resource region of the RA channel regarding the cell of the non-terrestrial network.

In one aspect, the frequency resource region of the RA channel regarding the cell of the non-terrestrial network may be larger than the frequency resource region of the RA channel regarding the cell of the terrestrial network.

In another aspect, the frequency resource region of the RA channel regarding the cell of the non-terrestrial network may be divided into a plurality of areas, and the RA related information may further include information indicating positions of the plurality of areas.

In another aspect, an index of the RA preamble may be mapped to any one predetermined area among the plurality of areas.

In another aspect, the RA related information may further include information indicating the area to which the index of the RA preamble is mapped.

In another aspect, the index of the RA preamble may be mapped to any one of the plurality of areas based on a modular operation for the index.

In another aspect, at least one of the plurality of areas may be dedicated to a UE using an ultra-reliable low latency communication (URLLC) packet.

In another aspect, the method may further include receiving, from the non-terrestrial network node, a physical downlink control channel (PDCCH) which is scrambled by a random access-radio network temporary identifier (RA-RNTI) calculated based on the frequency resource region of the RA channel regarding the cell of the non-terrestrial network in a response to transmission of the generated RA preamble, and receiving, from the non-terrestrial network node, a random access response message indicated by the PDCCH.

According to another aspect of the present invention, there is provided a method of performing initial access by a base station in a non-terrestrial network system. The method includes transmitting a synchronization signal block (SSB) to a UE for searching a cell of a non-terrestrial network, transmitting random access (RA) related information about the cell of the non-terrestrial network after the UE completes cell search, and receiving, from the UE, an RA preamble generated based on a frequency resource region of an RA channel regarding the cell of the non-terrestrial network. Here, the RA related information may include first offset information indicating a start point of a frequency resource region of an RA channel regarding a cell of a terrestrial network, and a second offset indicating a start point of the frequency resource region of the RA channel regarding the cell of the non-terrestrial network.

In one aspect, the frequency resource region of the RA channel regarding the cell of the non-terrestrial network may be larger than the frequency resource region of the RA channel regarding the cell of the terrestrial network.

In another aspect, the frequency resource region of the RA channel regarding the cell of the non-terrestrial network may be divided into a plurality of areas, and the RA related information may further include information indicating positions of the plurality of areas.

In another aspect, an index of the RA preamble may be mapped to any one predetermined area among the plurality of areas.

In another aspect, the RA related information may further include information indicating the area to which the index of the RA preamble is mapped.

In another aspect, the index of the RA preamble may be mapped to any one of the plurality of areas based on a modular operation for the index.

In another aspect, at least one of the plurality of areas may be dedicated to a UE using an ultra-reliable low latency communication (URLLC) packet.

In another aspect, the method may further include transmitting, to the UE, a physical downlink control channel (PDCCH) which is scrambled by a random access-radio network temporary identifier (RA-RNTI) calculated based on the frequency resource region of the RA channel regarding the cell of the non-terrestrial network as a response to transmission of the generated RA preamble, and transmitting a random access response message indicated by the PDCCH to the UE.

According to another aspect of the present invention, there is provided a UE performing initial access in a non-terrestrial network system. The UE includes a processor configured to search for a cell of a non-terrestrial network based on a synchronization signal block (SSB) transmitted from a non-terrestrial network node and to generate a random access (RA) preamble based on a frequency resource region of an RA channel related to the cell of the non-terrestrial network, and a transceiver configured to receive RA related information about the cell of the non-terrestrial network from the non-terrestrial network node after the cell search is completed, to generate an RA preamble based on the frequency resource region of the RA channel regarding the cell of the non-terrestrial network, and to transmit the generated RA preamble to the non-terrestrial network node. Here, the RA related information may include first offset information indicating a start point of a frequency resource region of an RA channel regarding a terrestrial network cell, and second offset information indicating a start point of the frequency resource region of the RA channel regarding the cell of the non-terrestrial network.

According to another aspect of the present invention, there is provided a non-terrestrial network node performing initial access in a non-terrestrial network system. The node includes a processor configured to generate a synchronization signal block (SSB) and to generate random access (RA) related information about a cell of a non-terrestrial network, and a transceiver configured to transmit the SSB to a UE for searching a cell of the non-terrestrial network, to transmit an RRC message to the UE after cell search by the UE is completed, and to receive, from the UE, an RA preamble generated based on a frequency resource region of an RA channel regarding the cell of the non-terrestrial network. Here, the RA related information may include first offset information indicating a start point of a frequency resource region of an RA channel regarding a cell of a terrestrial network, and second offset information indicating a start point of the frequency resource region of the RA channel regarding the cell of the non-terrestrial network.

According to another aspect of the present invention, there is provided a method of performing initial access by a UE in a mobile communication system including a plurality of base stations providing different cell coverages. The method includes searching a cell of a first base station based on a synchronization signal block (SSB) transmitted from the first base station, receiving, from the first base station, random access (RA) related information about a cell of a second base station overlapping with or adjacent to the cell of the first base station after the cell search is completed, generating an RA preamble based on a frequency resource region of an RA channel regarding the cell of the second base station, and transmitting the generated RA preamble to the second base station.

In one aspect, the first base station may be included in a terrestrial network, and the second base station may be included in a non-terrestrial network.

In another aspect, the first base station may be included in a non-terrestrial network, and the second base station may be included in a terrestrial network.

In another aspect, the first base station and the second base station may support dual connectivity (DC) for the UE.

In another aspect, the RA related information may be included in system information or an RRC message and transmitted.

According to another aspect of the present invention, there is provided a method of performing random access of a UE based on network slicing. The method includes receiving, from a base station, slicing related information in which parameters with respect to random access resources and priority of random access are individually set for each network slice, and performing a random access procedure for the base station based on the slicing related information.

In one aspect, the slicing related information may be received by being included in system information or an RRC message.

In another aspect, the random access procedure may include transmitting a random access preamble to the base station based on the random access resources and the priority of random access, and receiving a random access response message for the random access preamble from the base station.

In another aspect, the slicing related information may individually set a random access transmission power offset value for each slice.

In another aspect, a random access transmission power offset value of a network slice dedicated to an ultra-reliable and low latency communications (URLLC) service may be greater than a random access transmission power offset value of a network slice that is not dedicated to the URLLC service.

In another aspect, the parameters with respect to the random access resources may include msg1-FDM and msg1-FrequencyStart, and the msg1-FDM and msg1-FrequencyStart may be individually configured for each network slice.

In another aspect, when the UE performs a handover from a serving cell to a target cell, the random access procedure may be performed on a contention-free basis.

In another aspect, a handover related message of the base station may include at least a part of the slicing related information.

In another aspect, the handover related message of the base station may include information on whether network slicing is applied.

In another aspect, a random access backoff time of a network slice dedicated to the URLLC service may be shorter than a random access backoff time of another network slice that is not dedicated to the URLLC service.

In another aspect, a random access backoff time of a network slice dedicated to an mMTC service may be longer than a random access backoff time of another network slice that is not dedicated to the mMTC service.

According to another aspect of the present invention, there is provided a method of performing random access of a base station based on network slicing. The method includes transmitting, to a UE, slicing related information in which parameters with respect to random access resources and priority of random access are individually set for each network slice, and performing a random access procedure with the UE based on the slicing related information.

In one aspect, the slicing related information may be received by being included in system information or an RRC message.

In another aspect, the random access procedure may include receiving a random access preamble from the UE based on the random access resource and the priority of random access, and transmitting a random access response message for the random access preamble to the UE.

In another aspect, the slicing related information may individually set a random access transmission power offset value for each slice.

In another aspect, a random access transmission power offset value of a network slice dedicated to an ultra-reliable and low latency communications (URLLC) service may be greater than a random access transmission power offset value of a network slice that is not dedicated to the URLLC service.

In another aspect, the parameters with respect to the random access resources may include msg1-FDM and msg1-FrequencyStart, and the msg1-FDM and msg1-FrequencyStart may be individually configured for each network slice.

In another aspect, when the UE performs a handover from a serving cell to a target cell, the random access procedure may be performed on a contention-free basis.

In another aspect, a handover related message of the base station may include at least a part of the slicing related information.

In another aspect, the handover related message of the base station may include information on whether network slicing is applied.

In another aspect, a random access backoff time of a network slice dedicated to the URLLC service may be shorter than a random access backoff time of another network slice that is not dedicated to the URLLC service.

In another aspect, a random access backoff time of a network slice dedicated to an mMTC service may be longer than a random access backoff time of another network slice that is not dedicated to the mMTC service.

According to another aspect of the present invention, there is provided a UE performing random access based on network slicing. The UE includes a transceiver configured to receive, from a base station, slicing related information in which parameters with respect to random access resources and priority of random access are individually set for each network slice and to perform a random access procedure for the base station based on the slicing related information, and a processor configured to generate a random access preamble used for the random access procedure.

According to another aspect of the present invention, there is provided a base station performing random access based on network slicing. The base station includes a transceiver configured to transmit, to a UE, slicing related information in which parameters with respect to random access resources and priority of random access are individually set for each network slice and to perform a random access procedure with the UE based on the slicing related information, and a processor configured to generate a random access response message used for the random access procedure.

Advantageous Effects

Performance degradation can be reduced when random access is performed in a non-terrestrial network system.

In addition, effective random access can be performed in a network slicing environment.

DESCRIPTION OF EXEMPLARY EMBODIMENTS

Figure 1:
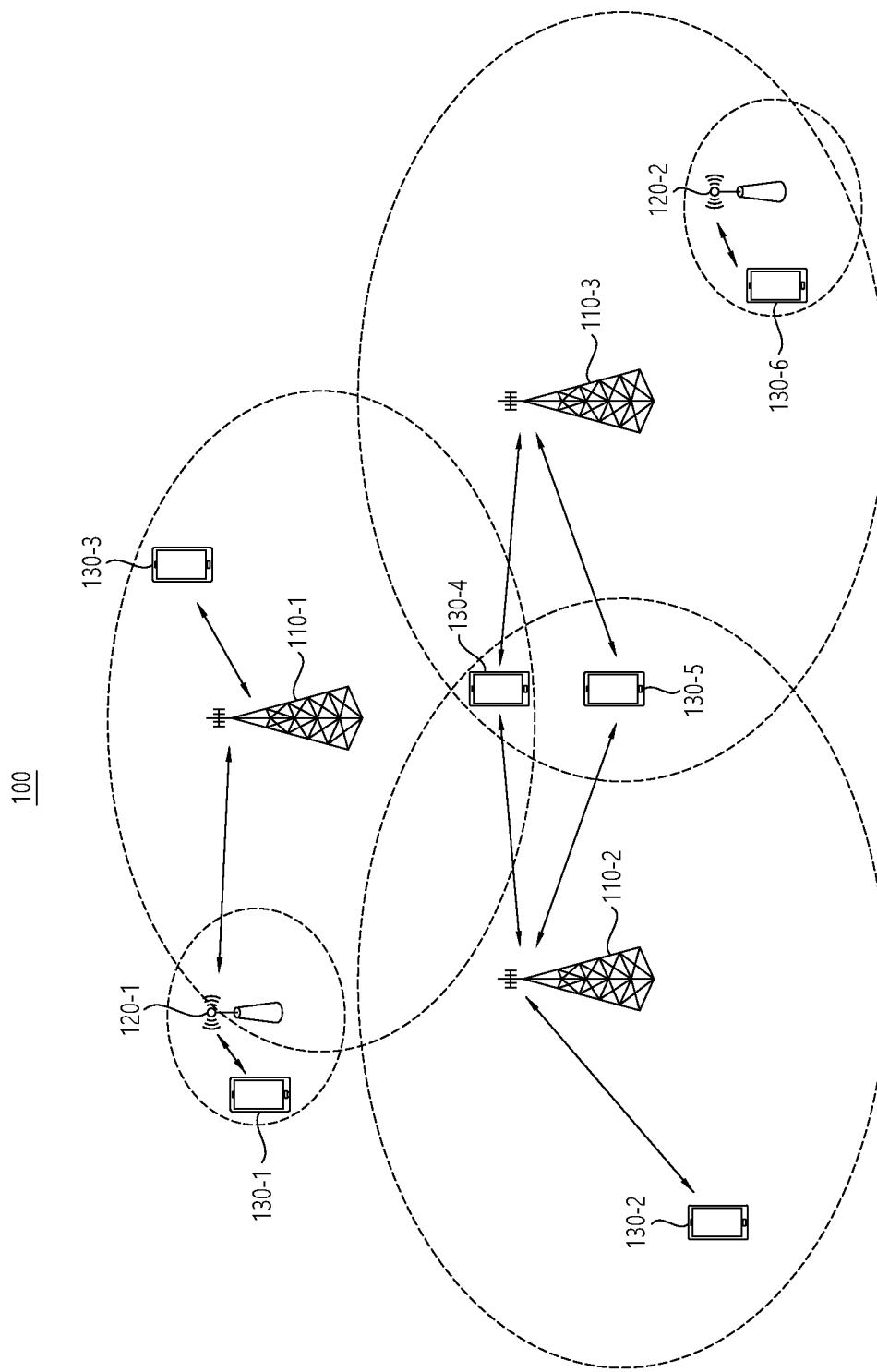
FIG. 1 is a conceptual diagram illustrating a wireless communication system according to an embodiment of the present invention.

While the present invention is susceptible to various modifications and alternative forms, specific embodiments thereof are shown by way of example in the drawings. However, the present invention should not be construed as limited to the embodiments set forth herein, but on the contrary, the disclosure is to cover all modifications, equivalents, and alternatives falling within the spirit and scope of the embodiments. In describing each figure, like reference numerals are used for like elements.

While terms, such as "first", "second", "A", "B," etc. may be used to describe various components, such components must not be limited by the above terms. The above terms are used only to distinguish one component from another. For example, without departing from the scope of the present invention, a first component may be referred to as a second component, and similarly, a second component may also be referred to as a first component. Further, the term "and/or" includes combinations of a plurality of related listed items or any of a plurality of related listed items.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The terms used in the present description are merely used in order to describe particular embodiments, and are not intended to limit the scope of the present invention. An element described in the singular form is intended to include a plurality of elements unless the context clearly indicates otherwise. In the present description, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless otherwise defined, all terms including technical and scientific terms used in the present description have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, preferred embodiments according to the present invention will be described in detail with reference to the accompanying drawings.

FIG. 1 is a conceptual diagram illustrating a wireless communication system according to an embodiment of the present invention.

Referring to FIG. 1, the wireless communication system 100 may include a plurality of communication nodes 110-1, 110-2, 110-3, 120-1, 120-2, 130-1, 130-2, 130-3, 130-4, 130-5, and 130-6.

Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple a (FDMA) based communication protocol, an orthogonal frequency division multiplexing (OFDM) based communication protocol, an orthogonal frequency division multiple access (OFDMA) based communication protocol, a single carrier (SC)-FDMA based communication protocol, a non-orthogonal multiplexing access (NOMA) based communication protocol, a space division multiple access (SDMA) based communication protocol, and the like.

The wireless communication system 100 may include a plurality of base stations 110-1, 110-2, 110-3, 120-1, and 120-2 and a plurality of UEs 130-1, 130-2, 130-3, 130-4, 130-5, and 130-6).

Each of the first base station 110-1, the second base station 110-2, and the third base station 110-3 may form a macro cell. Each of the fourth base station 120-1 and the fifth base station 120-2 may form a small cell. The fourth base station 120-1, the third UE 130-3, and the fourth UE 130-4 may belong to the coverage of the first base station 110-1. The second UE 130-2, the fourth UE 130-4, and the fifth UE 130-5 may belong to the coverage of the second base station 110-2. The fifth base station 120-2, the fourth UE 130-4, the fifth UE 130-5, and the sixth UE 130-6 may belong to the coverage of the third base station 110-3. The first UE 130-1 may belong to the coverage of the fourth base station 120-1. The sixth UE 130-6 may belong to the coverage of the fifth base station 120-2.

Here, each of the plurality of base stations 110-1, 110-2, 110-3, 120-1, and 120-2 may also be called a NodeB, an evolved NodeB, a next generation Node B (gNB), a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, and the like. Each of the plurality of UEs 130-1, 130-2, 130-3, 130-4, 130-5, and 130-6 may also be called a terminal, an access terminal, a mobile terminal, a station, a subscriber station, a mobile station, a portable subscriber station, a node, a device, and the like.

The plurality of communication nodes 110-1, 110-2, 110-3, 120-1, 120-2, 130-1, 130-2, 130-3, 130-4, 130-5, and 130-6 may support long term evolution (LTE), LTE-advanced (LTE-A), new radio (NR), and the like defined in cellular communication (e.g., 3rd generation partnership project (3GPP)) standards. The plurality of base stations 110-1, 110-2, 110-3, 120-1, and 120-2 may operate in different frequency bands or may operate in the same frequency band. The plurality of base stations 110-1, 110-2, 110-3, 120-1, and 120-2 may be connected to each other through an ideal backhaul or a non-ideal backhaul and may exchange information through an ideal backhaul or a non-ideal backhaul. Each of the plurality of base stations 110-1, 110-2, 110-3, 120-1, and 120-2 may be connected to a core network (not shown) through an ideal backhaul or a non-ideal backhaul. Each of the plurality of base stations 110-1, 110-2, 110-3, 120-1, and 120-2 may transmit a signal received from the core network to corresponding UEs 130-1, 130-2, 130-3, 130-4, 130-5, and 130-6 and transmit signals received from the corresponding UEs 130-1, 130-2, 130-3, 130-4, 130-5, and 130-6 to the core network.

Each of the plurality of base stations 110-1, 110-2, 110-3, 120-1, and 120-2 may support OFDMA-based downlink transmission and SC-FDMA-based uplink transmission. In addition, each of the plurality of base stations 110-1, 110-2, 110-3, 120-1, and 120-2 may support multiple input multiple output (MIMO) (e.g., single user (SU)-MIMO, multi-user (MU)-MIMO, massive MIMO, etc.), coordinated multipoint (CoMP) transmission, carrier aggregation transmission, transmission in an unlicensed band, device-to-device (D2D) communication (or proximity services (ProSe)), and the like. Here, each of the plurality of UEs 130-1, 130-2, 130-3, 130-4, 130-5, and 130-6 may perform operations corresponding to the base stations 110-1, 110-2, 110-3, 120-1, and 120-2 and/or operations supported by the base stations 110-1, 110-2, 110-3, 120-1, and 120-2.

For example, the second base station 110-2 may transmit a signal to the fourth UE 130-4 based on SU-MIMO, and the fourth UE 130-4 may receive the signal from the second base station 110-2 according to SU-MIMO. The second base station 110-2 may transmit a signal to the fourth UE 130-4 and the fifth UE 130-5 based on MU-MIMO, and the fourth UE 130-4 and the fifth UE 130-5 may receive the signal from the second base station 110-2 according to MU-MIMO. Each of the first base station 110-1, the second base station 110-2, and the third base station 110-3 may transmit a signal to the fourth UE 130-4 based on CoMP, and the fourth UE 130-4 may receive signals from the first base station 110-1, the second base station 110-2, and the third base station 110-3 according to CoMP. Each of the plurality of base stations 110-1, 110-2, 110-3, 120-1, and 120-2 may transmit/receive a signal to/from the UEs 130-1, 130-2, 130-3, 130-4, 130-5, and 130-6 belonging to the coverage thereof based on CA.

Each of the first base station 110-1, the second base station 110-2, and the third base station 110-3 may coordinate D2D communication with the fourth UE 130-4 and the fifth UE 130-5, and each of the fourth UE 130-4 and the fifth UE 130-5 may perform D2D communication according to coordination of each of the second base station 110-2 and the third base station 110-3.

When a method (e.g., transmission or reception of a signal) performed by a first communication node among communication nodes is described, a second communication node corresponding thereto may perform a method (e.g., reception or transmission of a signal) corresponding to the method performed by the first communication node. That is, when the operation of a UE is described, the corresponding base station may perform the operation corresponding to the operation of the UE. On the other hand, when the operation of a base station is described, the corresponding UE may perform the operation corresponding to the operation of the base station.

Hereinafter, downlink (DL) means communication from a base station to a UE, and uplink (UL: uplink) means communication from a UE to a base station. In downlink, a transmitter may be a part of a base station and a receiver may be a part of a UE. In uplink, a transmitter may be a part of a UE and a receiver may be a part of a base station.

With the recent rapid spread of smartphones and Internet of Things (IoT) UEs, the amount of information exchanged through a communication network is increasing. Accordingly, it is necessary to consider an environment (e.g., enhanced mobile broadband communication) that provides faster services to more users than the existing communication system (or the existing radio access technology) in next-generation wireless access technology. To this end, design of a communication system in consideration of machine type communication (MTC) providing services by connecting a plurality of devices and objects is under discussion. In addition, design of a communication system (e.g., ultra-reliable and low latency communication (URLLC)) considering services and/or UEs sensitive to communication reliability and/or latency is under discussion.

Hereinafter, for convenience of description, the next-generation radio access technology is referred to as new radio access technology (RAT), and a wireless communication system to which the new RAT is applied is referred to as a new radio (NR) system in the present description. In the present description, frequencies, frames, subframes, resources, resource blocks, regions, bands, subbands, control channels, data channels, synchronization signals, various reference signals, various signals or various messages related to NR may be interpreted in various meanings used in the past and present or will be used in the future.

Figure 2:
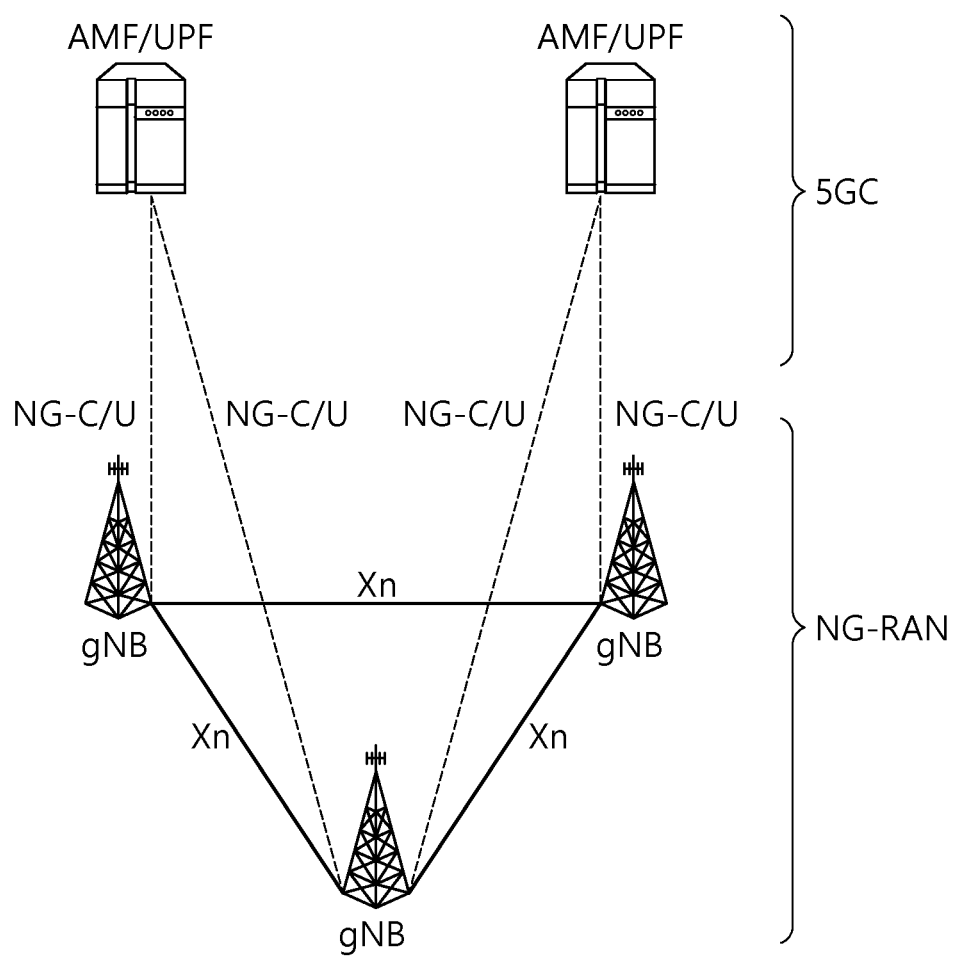
FIG. 2 is an exemplary diagram showing an NR system to which a data transmission method according to an embodiment of the present invention is applicable.

FIG. 2 is an exemplary diagram showing an NR system to which a data transmission method according to an embodiment of the present invention can be applied.

NR, which is next-generation wireless communication technology that is being standardized in 3GPP, provides an improved data rate compared to LTE and can satisfy various QoS requirements for each segmented and detailed usage scenario. In particular, enhancement mobile broadband (eMBB), massive MTC (mMTC), and ultra-reliable and low latency communications (URLLC) have been defined as representative usage scenarios of NR. As a method for satisfying requirements for each scenario, a frame structure that is flexible compared to LTE is provided. The frame structure of NR supports a frame structure based on multiple subcarriers. A basic subcarrier spacing (SCS) is 15 kHz, and a total of 5 types of SCS are supported at 15 kHz*2^n.

Referring to FIG. 2, a next generation-radio access network (NG-RAN) includes gNBs that provide an NG-RAN user plane (SDAP/PDCP/RLC/MAC/PHY) and control plane (RRC) protocol termination for UEs. Here, NG-C represents a control plane interface used for an NG2 reference point between NG-RAN and 5-generation core (5GC). NG-U represents a user plane interface used for an NG3 reference point between NG-RAN and 5GC.

The gNBs are interconnected through the Xn interface and connected to the 5GC through an NG interface. More specifically, a gNB is connected to an access and mobility management function (AMF) through the NG-C interface and connected to a user plane function (UPF) through the NG-U interface.

In the NR system of FIG. 2, multiple numerologies may be supported. Here, numerology may be defined by a subcarrier spacing and a cyclic prefix (CP) overhead. In this case, a plurality of subcarrier spacings may be derived by scaling the basic subcarrier spacing with an integer. Further, even though it is assumed that a very low subcarrier spacing is not used at a very high carrier frequency, a numerology to be used can be selected independently of the frequency band.

In addition, in the NR system, various frame structures according to a number of numerologies may be supported.
<NR Waveform, Numerology, and Frame Structure>

In NR, a CP-OFDM waveform using a cyclic prefix is used for downlink transmission, and CP-OFDM or DFT-s-OFDM is used for uplink transmission. OFDM technology is easy to combine with MIMO (Multiple Input Multiple Output) and has advantages of using a low-complexity receiver with high frequency efficiency.

In NR, since requirements for a data rate, a delay rate, coverage, and the like are different for each of the three scenarios described above, it is necessary to efficiently satisfy the requirements for each scenario through a frequency band constituting an arbitrary NR system. To this end, technology for efficiently multiplexing radio resources based on a plurality of different numerologies has been proposed.

Specifically, NR transmission numerology is determined based on a sub-carrier spacing and a cyclic prefix (CP) and changed using a value $\mu$ as an exponential value of 2 based on 15 kHz as shown in Table 1 below.

TABLE 1

| Subcarrier spacing (kHz) | Cyclic prefix | Supported for data | Supported for synch |
|---|---|---|---|
| 15 | Normal | Yes | Yes |
| 30 | Normal | Yes | Yes |
| 60 | Normal, Extended | Yes | No |
| 120 | Normal | Yes | Yes |
| 240 | Normal | No | Yes |

As shown in Table 1, NR numerologies may be divided into five types according to the subcarrier spacing. This is different from the fact that the subcarrier spacing of LTE, one of the 4G communication technologies, is fixed to 15 kHz. Specifically, subcarrier spacings used for data transmission are 15, 30, 60, and 120 kHz, and subcarrier spacings used for synchronization signal transmission are 15, 30, 120 and 240 kHz in NR. In addition, an extended CP is applied only to the 60 kHz subcarrier spacing. On the other hand, in the frame structure in NR, a frame composed of 10 subframes each having a length of 1 ms and having a length of 10 ms is defined. One frame can be divided into half frames of 5 ms, and each half frame includes 5 subframes. In the case of a 15 kHz subcarrier spacing, one subframe is composed of one slot, and each slot includes 14 OFDM symbols.
<NR physical resources>

With respect to physical resources in NR, an antenna port, a resource grid, a resource element, a resource block, a bandwidth part, etc. are considered.

An antenna port is defined such that a channel on which a symbol on an antenna port is carried can be inferred from a channel on which another symbol on the same antenna port is carried. When the large-scale property of a channel carrying a symbol on one antenna port can be inferred from a channel carrying a symbol on another antenna port, the two antenna ports may be regarded as being in a QC/QCL (quasi co-located or quasi co-location) relationship. Here, the large-scale property includes one or more of delay spread, Doppler spread, frequency shift, average received power, and received timing.

Figure 3:
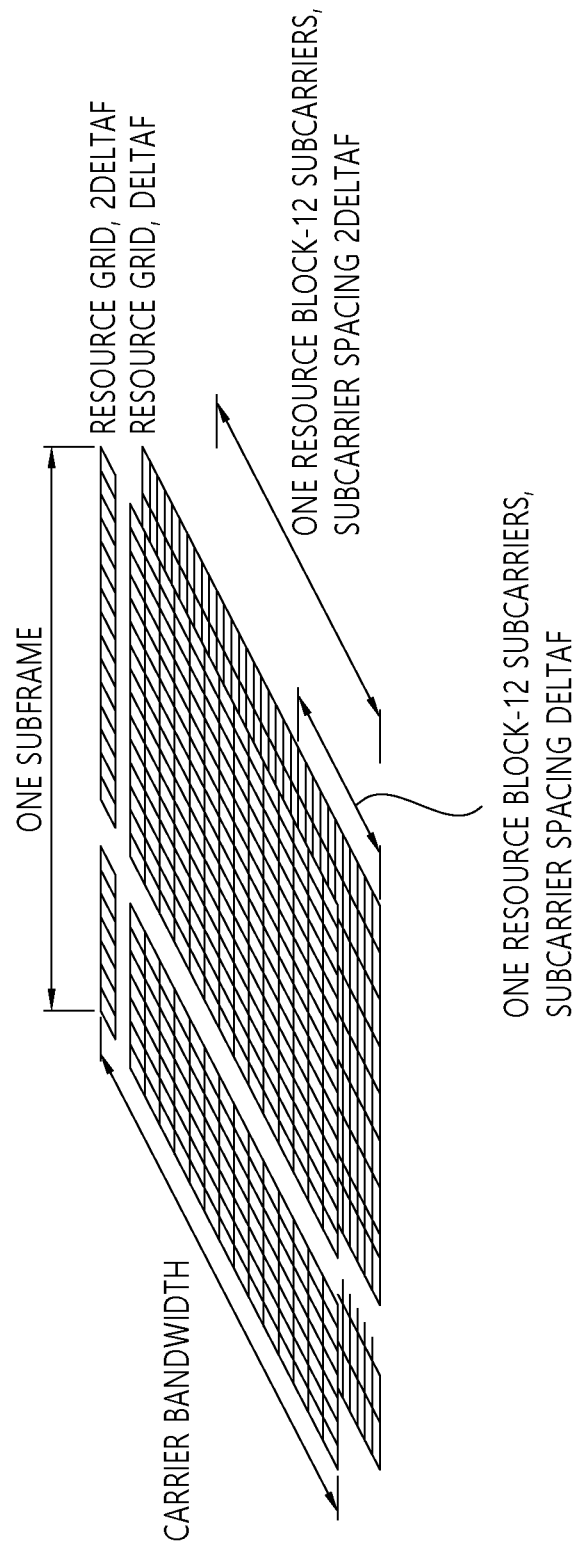
FIG. 3 is a diagram for describing a resource grid supported by radio access technology to which the present embodiment is applicable

FIG. 3 is a diagram for describing a resource grid supported by the radio access technology to which the present embodiment can be applied.

Referring to FIG. 3, since NR supports a plurality of numerologies on the same carrier, a resource grid may be present according to each numerology. In addition, the resource grid may be present according to an antenna port, a subcarrier spacing, and a transmission direction.

A resource block is composed of 12 subcarriers and is defined only in the frequency domain. In addition, a resource element is composed of one OFDM symbol and one subcarrier. Accordingly, the size of one resource block may vary according to the subcarrier spacing, as shown in FIG. 3. In addition, "Point A" serving as a common reference point for a resource block grid, a common resource block, a virtual resource block, and the like are defined in NR.

Figure 4:
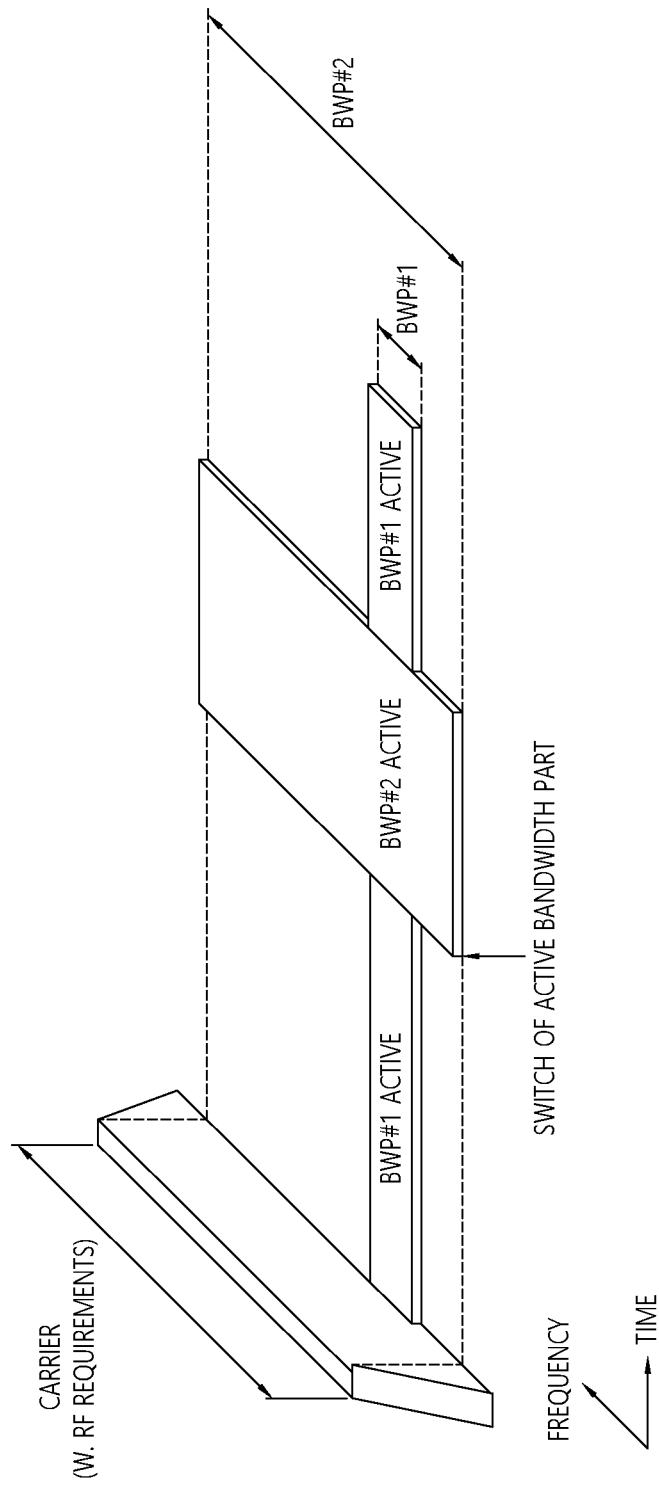
FIG. 4 is a diagram for describing a bandwidth part supported by the radio access technology to which the present embodiment is applicable.

FIG. 4 is a diagram for describing a bandwidth part supported by the radio access technology to which the present embodiment can be applied.

Unlike LTE in which the carrier bandwidth is fixed to 20 MHz, the maximum carrier bandwidth is set to 50 MHz to 400 MHz for each subcarrier spacing in NR. Therefore, it is not assumed that all UEs use all of these carrier bandwidths. Accordingly, as shown in FIG. 4, a bandwidth part (BWP) may be designated within a carrier bandwidth and used by a UE in NR. In addition, a bandwidth part is associated with one numerology and composed of a subset of consecutive common resource blocks, and may be dynamically activated with time. A maximum of four bandwidth parts is configured for a UE in uplink and downlink, and data is transmitted/received using an activated bandwidth part at a given time.

Uplink and downlink bandwidth parts are independently set in the case of a paired spectrum, whereas downlink and uplink bandwidth parts are set in pairs to share a center frequency in order to prevent unnecessary frequency re-tuning between downlink and uplink operations in the case of an unpaired spectrum.
<NR Initial Access>

In NR, a UE performs cell search and random access procedures in order to access a base station and perform communication.

Cell search is a procedure in which a UE synchronizes with a cell of a corresponding base station using a synchronization signal block (SSB) transmitted by the base station, obtains a physical layer cell ID, and obtains system information.

Figure 5:
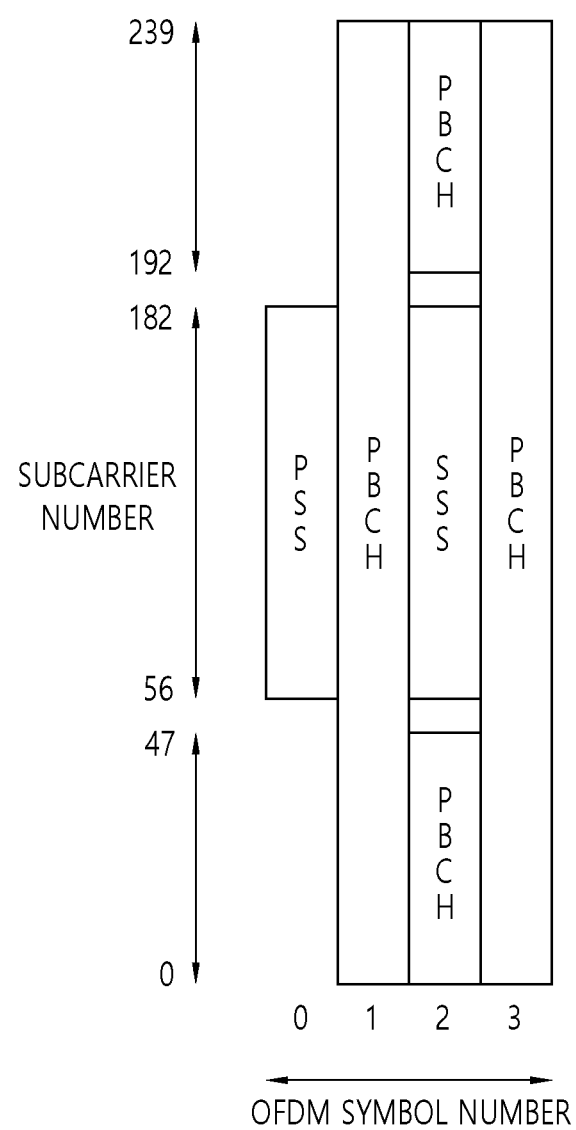
FIG. 5 is a diagram illustrating a synchronization signal block in the radio access technology to which the present embodiment is applicable.

FIG. 5 is a diagram illustrating a synchronization signal block in the radio access technology to which the present embodiment can be applied.

Referring to FIG. 5, the SSB is composed of a primary synchronization signal (PSS) and a secondary synchronization signal (SSS) each occupying one symbol and 127 subcarriers, and a PBCH spanning 3 OFDM symbols and 240 subcarriers.

A UE receives the SSB by monitoring the SSB in the time and frequency domains.

The SSB can be transmitted up to 64 times in 5 ms. A plurality of SSBs is transmitted using different transmission beams within 5 ms, and the UE performs detection on the assumption that SSBs are transmitted every 20 ms when viewed based on one specific beam used for transmission. The number of beams that can be used for SSB transmission within 5 ms may increase as the frequency band increases. For example, a maximum of 4 SSB beams can be transmitted at 3 GHz or less, and SSBs can be transmitted using a maximum of 8 different beams in a frequency band of 3 to 6 GHz and using a maximum of 64 different beams in a frequency band of 6 GHz or more.

Two SSBs are included in one slot, and the start symbol and the number of repetitions in the slot are determined according to a subcarrier spacing.

The SSB is not transmitted at the center frequency of a carrier bandwidth, unlike the SS in the conventional LTE. That is, the SSB may be transmitted in a place other than the center of the system band, and a plurality of SSBs may be transmitted in the frequency domain when broadband operation is supported. Accordingly, the UE monitors the SSB using a synchronization raster that is a candidate frequency position for monitoring the SSB. A carrier raster and a synchronization raster, which are center frequency position information of a channel for initial access, are newly defined in NR, and the synchronization raster has a wider frequency interval than the carrier raster and thus can support rapid SSB search of the UE.

The UE may acquire a master information block (MIB) through a PBCH of the SSB. The MIB includes minimum information for the UE to receive remaining minimum system information (RMSI) broadcast by a network. In addition, the PBCH may include information on the position of the first DM-RS symbol in the time domain, information for the UE to monitor SIB1 (e.g., SIB1 numerology information, information related to SIB1 CORESET, search space information, PDCCH related parameter information, etc.), offset information between a common resource block and the SSB (the position of the absolute SSB in a carrier is transmitted through SIB1), and the like. Here, the SIB1 numerology information is equally applied to some messages used in the random access procedure for the UE to access the base station after the UE completes the cell search procedure. For example, the SIB1 numerology information may be applied to at least one of messages 1 to 4 for the random access procedure.

The aforementioned RMSI may mean system information block 1 (SIB1), and SIB1 is periodically broadcast (e.g., 160 ms) in the cell. SIB1 includes information necessary for the UE to perform an initial random access procedure and is periodically transmitted through a PDSCH. To receive SIB1, the UE needs to receive numerology information used for SIB1 transmission and control resource set (CORESET) information used for SIB1 scheduling SIB1 through a PBCH. The UE checks scheduling information for SIB1 using an SI-RNTI in CORESET and acquires SIB1 on the PDSCH according to the scheduling information. SIBs other than SIB1 may be transmitted periodically or may be transmitted according to the request of the UE.

Figure 6:
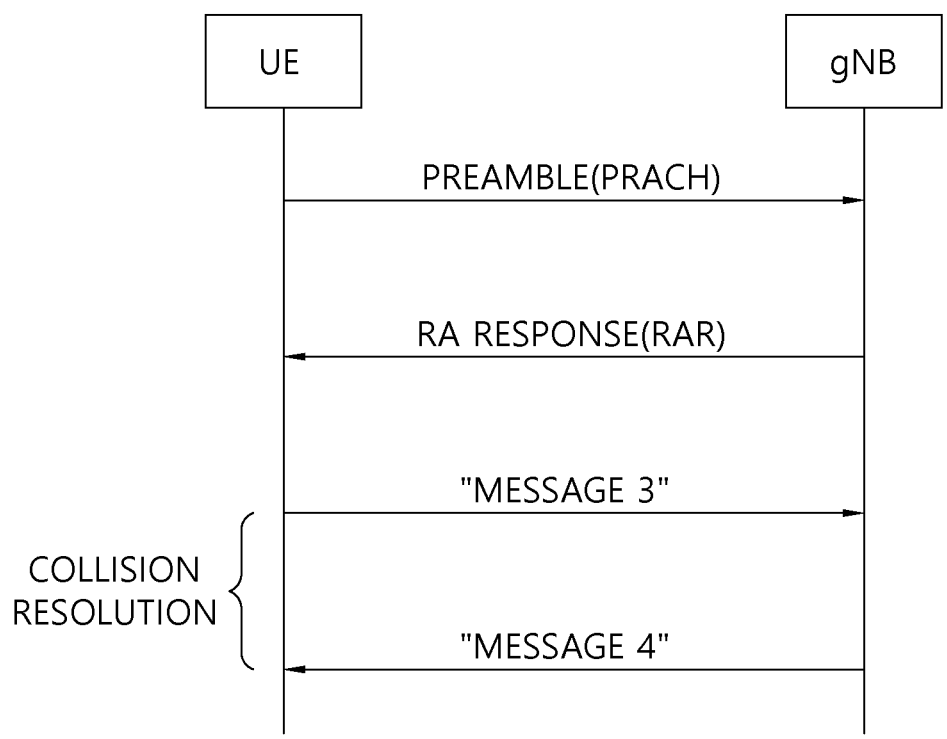
FIG. 6 is a diagram for describing a random access procedure in the radio access technology to which the present embodiment is applicable.

FIG. 6 is a diagram for describing a random access procedure in the radio access technology to which the present embodiment can be applied.

Referring to FIG. 6, upon completion of cell search, the UE transmits a random access preamble for random access to the base station. The random access preamble is transmitted through a PRACH. Specifically, the random access preamble is transmitted to the base station through a PRACH composed of consecutive radio resources in a specific slot that is periodically repeated. In general, when the UE initially accesses the cell, a contention-based random access procedure is performed, and when random access is performed for beam failure recovery (BFR), a contention-free random access procedure is performed.

The UE receives a random access response to the transmitted random access preamble. The random access response may include a random access preamble identifier (ID), a UL grant (uplink radio resource), a temporary cell-radio network temporary identifier (TC-RNTI), and a time advance command (TAC). Since one random access response may include random access response information for one or more UEs, the random access preamble identifier may be included to indicate a UE for which the included UL grant, TC-RNTI, and TAC are valid. The random access preamble identifier may be an identifier for the random access preamble received by the base station. The TAC may be included as information for the UE to adjust uplink synchronization. The random access response may be indicated by a random access identifier on a PDCCH, that is, a random access-radio network temporary identifier (RA-RNTI).

Upon reception of the valid random access response, the UE processes information included in the random access response and performs scheduled transmission to the base station. For example, the UE applies the TAC and stores the TC-RNTI. In addition, the UE transmits data stored in a buffer of the UE or newly generated data to the base station using the UL grant. In this case, information for identifying the UE needs to be included.

Non-Terrestrial Network

A non-terrestrial network refers to a network or a network segment using airborne vehicles such as a high altitude platform (HAPS) or a spaceborne vehicle such as a satellite. According to NTN defined in 3GPP, an artificial satellite is a network node that is connected to a UE through wireless communication and provides a wireless access service to the UE. In one aspect, a satellite in NTN may be configured to perform the same or similar functions and operations as a base station in a terrestrial network. In this case, from the viewpoint of a UE, the artificial satellite may be recognized as another base station. In that respect, the artificial satellite may be included in a base station in a broad sense in the present description. That is, a person skilled in the art can obviously derive an embodiment in which a base station is replaced with a satellite from the embodiments depicting the base station or describing the functions of the base station. Accordingly, even if such embodiments are not explicitly disclosed herein, such embodiments fall within the scope of the present description and the spirit of the present invention.

In 3GPP, technology for supporting NR operation in a non-terrestrial network using the aforementioned satellite or air transport vehicle is being developed. However, in the non-terrestrial network, the distance between a base station and a UE is longer than that in a terrestrial network using terrestrial base stations. Accordingly, a very large round trip delay (RTD) may occur. For example, it is known that RTD is 544.751 ms in an NTN scenario using geostationary earth orbiting (GEO) located at an altitude of 35,768 km, and RTD is 3.053 ms in an NTN scenario using HAPS located at an altitude of 229 km. In addition, RTD in an NTN scenario using a low earth orbiting (LEO) satellite system can be up to 25.76 ms. As such, in order to perform a communication operation to which the NR protocol is applied in a non-terrestrial network, technology for supporting base stations and UEs such that they can perform the NR operation even under such propagation delay.

Figure 7:
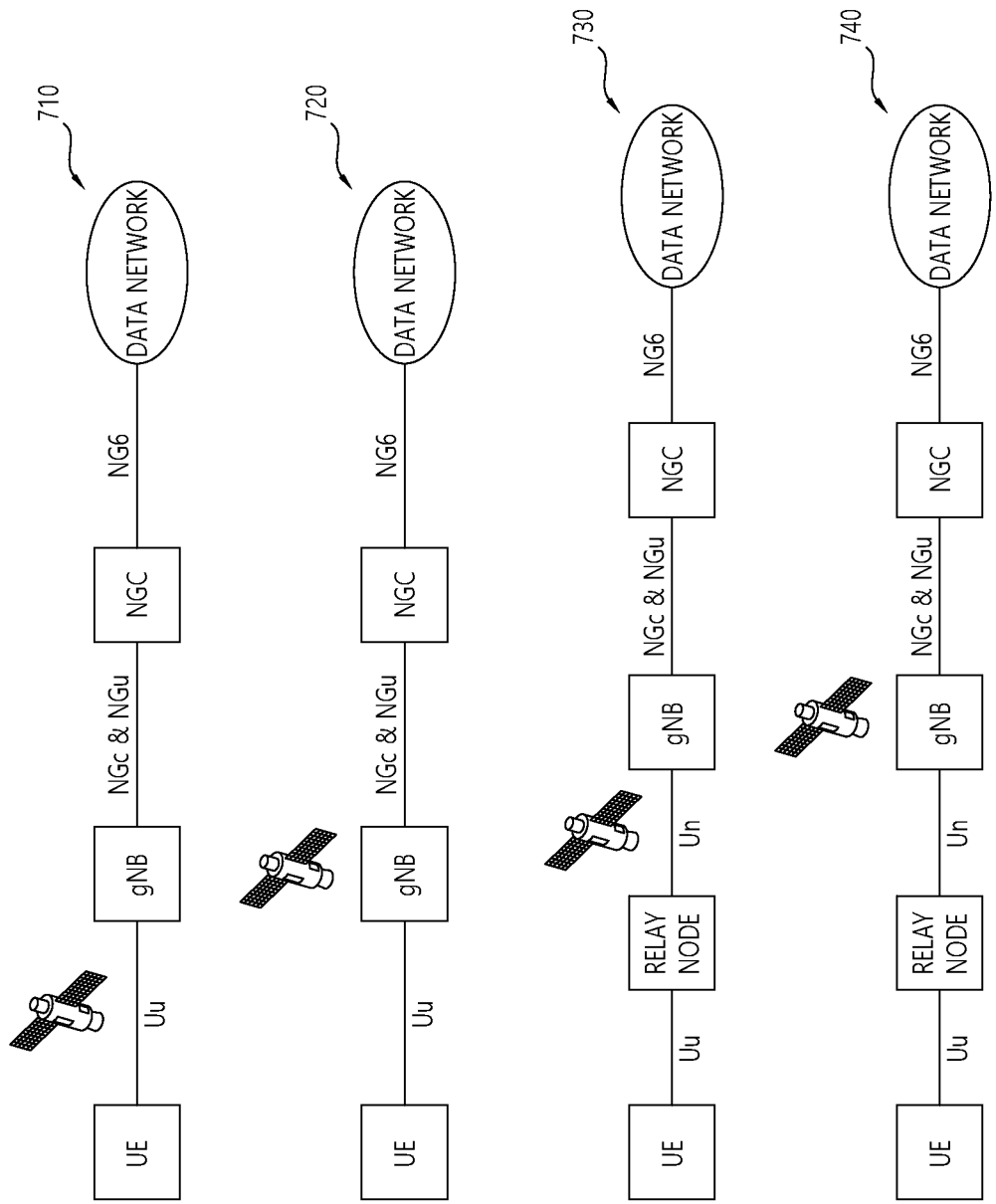
FIG. 7 is a diagram for describing various forms of a non-terrestrial network structure to which an embodiment can be applied.

FIG. 7 is a diagram for describing various forms of a non-terrestrial network structure to which an embodiment can be applied.

Referring to FIG. 7, the non-terrestrial network may be designed in a structure in which a UE performs wireless communication using a device located in the sky. For example, the non-terrestrial network may be implemented in a structure in which a satellite or an air transport device is positioned between a UE and a gNB to relay communication, such as a structure 710. As another example, the non-terrestrial network may be implemented in a structure in which a satellite or an air transport device performs some or all of the functions of a gNB to perform communication with a UE, such as a structure 720. As another example, the non-terrestrial network may be implemented in a structure in which a satellite or an air transport device is positioned between a relay node and a gNB to relay communication, such as a structure 730. As another example, the non-terrestrial network may be implemented in a structure in which a satellite or an air transport device performs some or all of the functions of a gNB to perform communication with a relay node, such as a structure 740.

Accordingly, a component for performing communication with a UE in connection with a core network is described as a network node or a base station in the present description, but this may refer to the aforementioned airborne vehicles or spaceborne vehicles. If necessary, a network node or a base station may mean the same device, or may be used to distinguish different devices according to a non-terrestrial network structure.

That is, a network node or a base station refers to a device for transmitting/receiving data to/from a UE in a non-terrestrial network structure and controlling an access procedure and a data transmission/reception procedure of the UE. Accordingly, when airborne vehicles or spaceborne vehicles perform some or all of the functions of the base station, the network node or the base station may refer to an airborne vehicle or a spaceborne vehicle. Alternatively, when airborne vehicles or spaceborne vehicles execute a function of relaying signals of separate terrestrial base stations, the network node or the base station may refer to a terrestrial base station.

Each embodiment provided below may be applied to an NR UE through an NR base station or may be applied to an LTE UE through an LTE base station. In addition, each embodiment provided below may be applied to an LTE UE connected to an eLTE base station connected through a 5G system (or 5G core network), and applied to an E_UTRA NR dual connectivity (EN-DC) UE or an NR E-UTRA dual connectivity (NE-DC) UE that simultaneously provides MTE and NR wireless connection.

Random Access Procedure in Non-Terrestrial Network

For uplink synchronization setup in NR, a UE transmits a random access preamble for a corresponding RACH occasion (RO) to a network node, and the network node may receive the random access preamble and then use it for synchronization with the UE through timing advance (TA) estimation. The UE transmits the random access preamble at different times according to a delay time difference between the UE and the network node, and various random access preamble formats and random access preamble monitoring periods according to various scenarios such that the network node detects a plurality of random access preambles. The longest random access preamble format in the NR standard can accept a delay difference of about 0.68 ms between UEs. However, since a maximum delay difference may increase to 10.3 ms in NTN, different preamble receiving windows may overlap, and an RO for a random access preamble received by the network node may be ambiguous.

In this case, the ambiguity of random access preamble reception can be resolved by appropriately designing a long time interval between consecutive RACH opportunities in consideration of the maximum delay. However, in a situation in which the time interval between RACH opportunities has increased, all UEs present in one cell still have to perform a random access procedure using a limited number (i.e., 64) of preamble sequences in one RACH opportunity, and thus the capacity of the random access preamble to be accepted during one RACH opportunity is insufficient. In addition, since some preamble sequences provided in one RACH opportunity are allocated as resources for non-contention based random access and the remaining preamble sequences are allocated as preamble sequences for contention based random access, the shortage of preamble sequence capacity is aggravated. This eventually causes deterioration of performance of the random access procedure, which is most important for initial access, and thus a method for solving this problem is required.

Enhanced PRACH Frequency Resources

An embodiment includes a method of extending, increasing, or adding a frequency resource (hereinafter referred to as a PRACH frequency resource) allocated for transmission of a random access preamble in one RACH opportunity. For example, in a non-NTN cell environment (e.g., TN cell), additional frequency resources used for an NTN cell are provided in addition to a frequency resource (e.g., 1.08 MHz) of the random access preamble available in one cell.

In one aspect, a PRACH frequency resource (hereinafter, an enhanced PRACH frequency resource) including frequency resources added for NTN may be divided into a plurality of areas (or a plurality of resource block groups).

Figure 8:
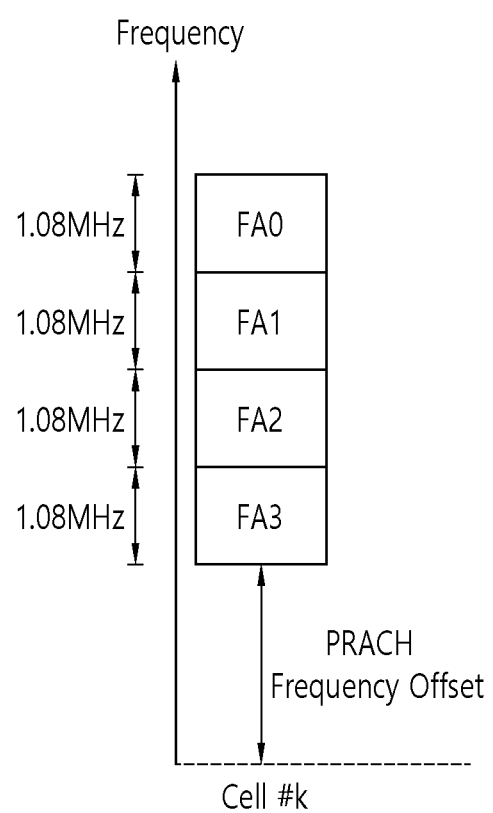
FIG. 8 is a diagram illustrating an enhanced PRACH frequency resource according to an embodiment.

FIG. 8 is a diagram illustrating an enhanced PRACH frequency resource according to an embodiment.

Referring to FIG. 8, in a single RACH opportunity, the enhanced PRACH frequency resource within one cell #k includes a plurality of divided areas such as frequency area (FA) 0, FA1, FA2, and FA3. That is, if the PRACH frequency resource set in a non-NTN network node (e.g., TN base station) is FA0, configuration of PRACH frequency resources such as FA1 to FA3 is added in an NTN network node (e.g., satellite). Each FA may include the same number of resource blocks.

Here, defining the enhanced PRACH frequency resources as 4 areas is merely an example, and they may be defined as fewer or more than 4 areas. In addition, although the frequency band size of one FA is indicated as 1.08 MHz, this is also an example.

Meanwhile, information on the enhanced PRACH frequency resources may be included in cell-specific PRACH configuration information, included in another RRC message specific to the UE, or included in system information (e.g., SIB1 or SIB2) and transmitted from the network node to the UE.

In one aspect, the information on the enhanced PRACH frequency resources may indicate specific locations of FA0, FA1, FA2, and FA3. For example, the information on the enhanced PRACH frequency resources may indicate all of a frequency offset of FA0, a frequency offset of FA1, a frequency offset of FA2, and a frequency offset of FA3. The information on the enhanced PRACH frequency resources may indicate all of the index of FA0, the index of FA1, the index of FA2, and the index of FA3. In this case, the bandwidths of the FAs are set to be the same, and may be different for cells (NTN cell and TN cell). The bandwidth of each FA may be information known in advance between a UE and a network node, or may be information separately included in the information on the enhanced PRACH frequency resources.

In another aspect, the information on the enhanced PRACH frequency resources may be different for each cell. For example, FA0, FA2, FA4, and FA6 may be scheduled or designed as enhanced PRACH frequency resources in cell i, and FA1, FA3, FA5, and FA6 may be scheduled or designed as enhanced PRACH frequency resources in cell #j adjacent to cell #i.

Enhanced PRACH Frequency Resource and Preamble Group Mapping

A method for a UE to transmit a random access preamble based on enhanced PRACH frequency resources as described above is shown in FIG. 9.

Figure 9:
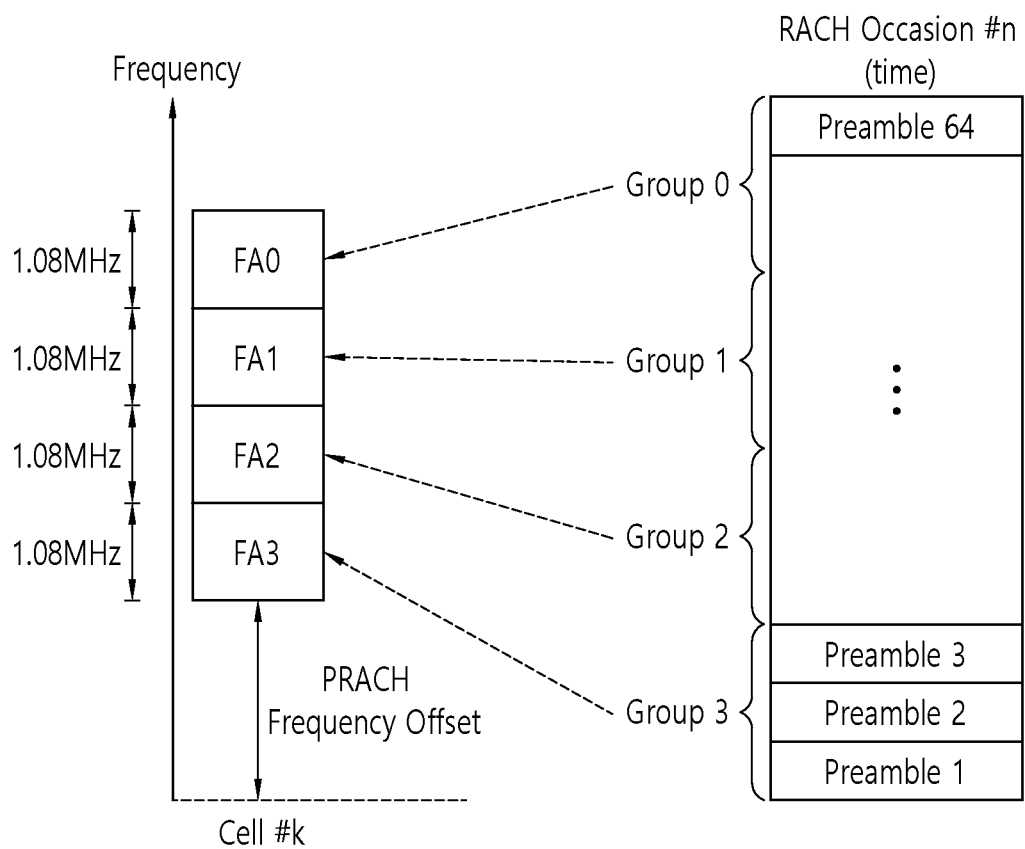
FIG. 9 illustrates a mapping relationship between an enhanced PRACH frequency resource and a random access preamble group according to an embodiment.

FIG. 9 shows a mapping relationship between enhanced PRACH frequency resources and a random access preamble group according to an embodiment.

Referring to FIG. 9, a total of 64 random access preambles are classified into four preamble groups in response to the number of FAs in RACH opportunity #n in cell #k, and each preamble group is mapped to a specific FA. A random access preamble in a single RACH opportunity may be transmitted through any one of FA0, FA1, FA2, and FA3 according to the group to which it belongs.

The method of mapping an intra-cell preamble group and an FA may include the following embodiments.

As an example, random access preamble groups may be designed such that random access preambles #1 to #16 belong to the 0-th preamble group, random access preambles #17 to #32 belong to the first preamble group, random access preambles #33 to #48 belong to the second preamble group, random access preambles #49 to #64 belong to the third preamble group. In addition, the 0-th preamble group may be mapped to FA0, the first preamble group may be mapped to FA1, the second preamble group may be mapped to FA2, and the third preamble group may be mapped to FA3. Accordingly, if a UE generates random access preamble #18 according to a randomly selected sequence, the random access preamble #18 belongs to the first preamble group, and thus it is transmitted through FA1. In addition, different UEs belonging to the same cell transmit random access preambles through any one of FA0, FA1, FA2, and FA3. A network node may receive random access preambles from different UEs belonging to one cell through FA0, FA1, FA2, and FA3.

Information on mapping between the intra-cell preamble groups and FAs may be information known in advance between a network node and a UE, or may be information transmitted by the network node to the UE through an RRC message (i.e., system information or PRACH configuration information).

As another example, in RACH opportunity #n in cell #k, each FA may include 64 random access preambles. That is, each of FA0, FA1, FA2, and FA3 may include 64 random access preambles. In this case, random access preambles #1 to #64 may be mapped to FA0 as the 0-th preamble group, random access preambles #65 to #128 may be mapped to FA1 as the first preamble group, random access preambles #129 to #192 may be mapped to FA2 as the second preamble group, and random access preambles #193 to #256 may be mapped to FA3 as the third preamble group.

In addition, different UEs belonging to the same cell transmit random access preambles through any one of FA0, FA1, FA2, and FA3. A network node may receive random access preambles from different UEs belonging to one cell through FA0, FA1, FA2, and FA3.

Information on mapping between intra-cell preamble groups and FAs may be information known in advance between a network node and a UE, or may be information transmitted by the network node to the UE through an RRC message (i.e., system information or PRACH configuration information).

As another example, mapping between preamble groups and FAs may be determined through a modular operation based on a preamble sequence or a preamble index. The modular operation may correspond to an operation performed by both a UE and a network node. For example, the modular operation may be defined as the following formula.

$$(\text{Preamble\_Index}) \text{Mod}(\text{Number of FAs}) \quad \text{[Formula 1]}$$

Referring to Formula 1, when there are a total of 4 FAs and a random access preamble index is 20, the modular operation result is 0, and thus random access preamble #20 is transmitted through FA0. In this way, the UE may determine a FA to which each random access preamble will be transmitted through the modular operation.

In addition, in order to further reduce the possibility of collision during random access of multiple UEs, UEs may be configured to select a random sequence based on unique ID information.

As another example, when performing random access based on enhanced PRACH frequency resources, a network node may provide a dedicated RACH opportunity different from that for other UEs to a UE performing contention-free-based random access. Here, the UE performing contention-free-based random access may include, for example, a UE performing handover from a TN network node to an NTN network node or vice versa. Alternatively, the UE performing contention-free-based random access may include a UE performing transmission/reception of URLLC packets. In order to provide a dedicated RACH opportunity to a group of such specific UEs, the network node may exclusively allocate a specific FA among enhanced PRACH frequency resources to the group of specific UEs. In this case, the network node sets both msg1-FDM and msg1-FrequencyStart values differently in RA related information and transmits the same to the group of specific UEs.

Enhanced PRACH Resources and RA-RNTI

As described above with reference to FIG. 6, the random access response message (msg2) transmitted by a network node is indicated by a random access identifier on a PDCCH, that is, RA-RNTI. This RA-RNTI may be calculated by the following formula.

$$1 + s\_id + 14 \times t\_id + 14 \times 80 \times f\_id + 14 \times 80 \times 8 \times ul\_carrier\_id \quad \text{[Formula 2]}$$

Referring to Formula 2, s_id is an index of the first OFDM symbol of a PRACH, t_id is the first slot of the PRACH in a system frame, f_id is an index of the PRACH in the frequency domain, and ul_carrier_id is an index of an uplink carrier used for random access preamble transmission.

Here, f_id may be associated with an index of an FA or a frequency offset of the FA according to the present embodiment. However, according to the enhanced PRACH frequency resources according to the present embodiment, the range of f_id in Formula 2 may be modified. For example, while 0≤f_id<8 in the NR system and 0≤f_id<6 in the LTE system, the range may be defined as 0≤f_id<(9 to 15) in the NTN system according to the present embodiment.

Since the range regarding f_id used for calculation of an RA-RNTI may have to be set differently for each cell or system, the network node may transmit information indicating that different ranges of f_ids should be applied depending on the communication system or version to the UE. For example, different parameters f, f', and f" may be additionally provided for systems to differently set i) a default first system (0≤f_id<8), ii) a second system (0≤f'_id<9), and iii) a third system (0≤f"_id<16), and ii) and iii) may be selectively operated exclusively for NTN.

Both the UE and the network node may perform an operation of calculating an RA-RNTI based on f_id setting as described above. That is, the UE may transmit a random access preamble to the network node through a specific FA, and then calculate an RA-RNTI based on the FA in order to receive a random access response message from the network node. In addition, after receiving the random access preamble from the UE, the network node may calculate an RA-RNTI based on the corresponding FA, generate a scrambled PDCCH as the calculated RA-RNTI, and transmit the scrambled PDCCH to the UE.

Figure 10A:
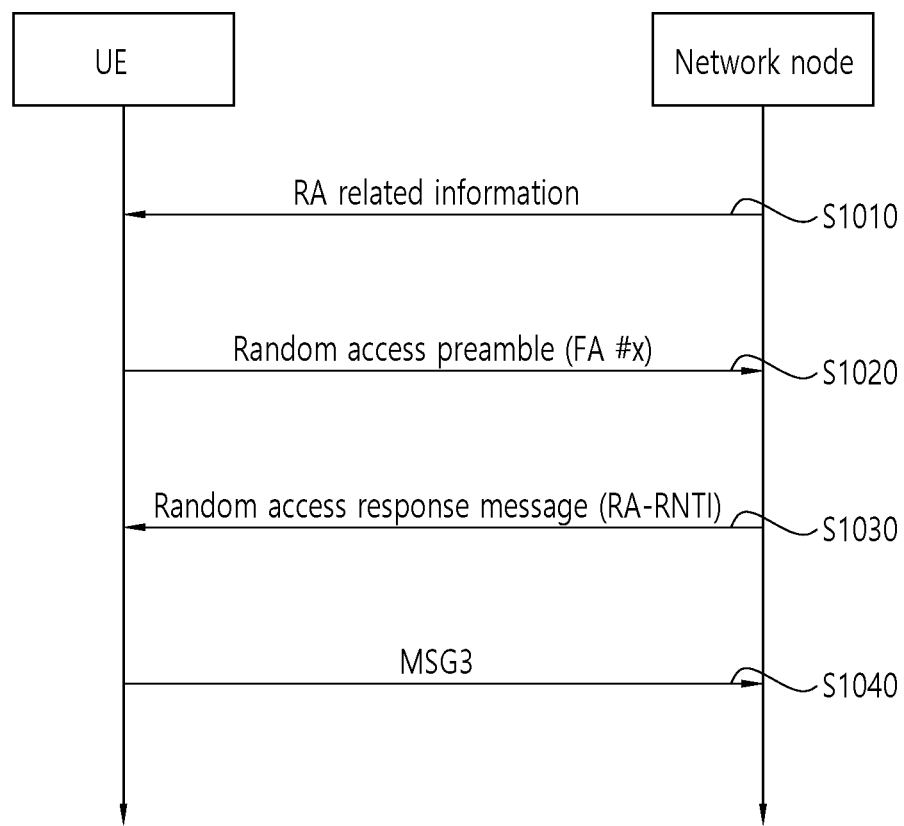
FIG. 10a is a flowchart for describing operations of a UE and a network node according to an embodiment.

FIG. 10a is a flowchart for describing operations of a UE and a network node according to an embodiment.

Referring to FIG. 10a, a base station performing communication using a non-terrestrial network transmits random access (RA) related information of a non-terrestrial network cell to a UE (S1010). As an example, the RA related information may include a root sequence index field, a PRACH configuration index field, and a PRACH frequency offset field. The RA related information may be transmitted by being included in system information or an RRC message.

In one aspect, the RA related information may include a size (or the number of resource blocks) field of a frequency region allocated for random access preamble transmission.

In another aspect, the RA related information may further include information on enhanced PRACH frequency resources.

In another aspect, it may further include information on mapping between a preamble group and an FA.

The UE transmits a random access preamble to the network node using FA #x among PRACH frequency resources enhanced in the non-terrestrial network cell (S1020). For example, the UE may perform a random access procedure to access the non-terrestrial network cell after receiving the system information. In this case, the UE may select and transmit one of a predetermined number of preambles using the RA related information.

Thereafter, the UE and the base station calculate an RA-RNTI according to Formula 2 above. Then, the network node transmits a random access response message including response information to the random access preamble to the UE (S1030). For example, the UE monitors whether a random access response message is received within a random access response window set based on random access preamble transmission resource information. If a random access response message identified by a temporary identifier related to random access preamble transmission is received within the random access response window, the UE receives the random access response message.

Thereafter, the UE transmits MSG 3 including request information for requesting an RRC connection (S1040). For example, MSG 3 may include information for requesting radio resource allocation necessary for uplink transmission.

Figure 10B:
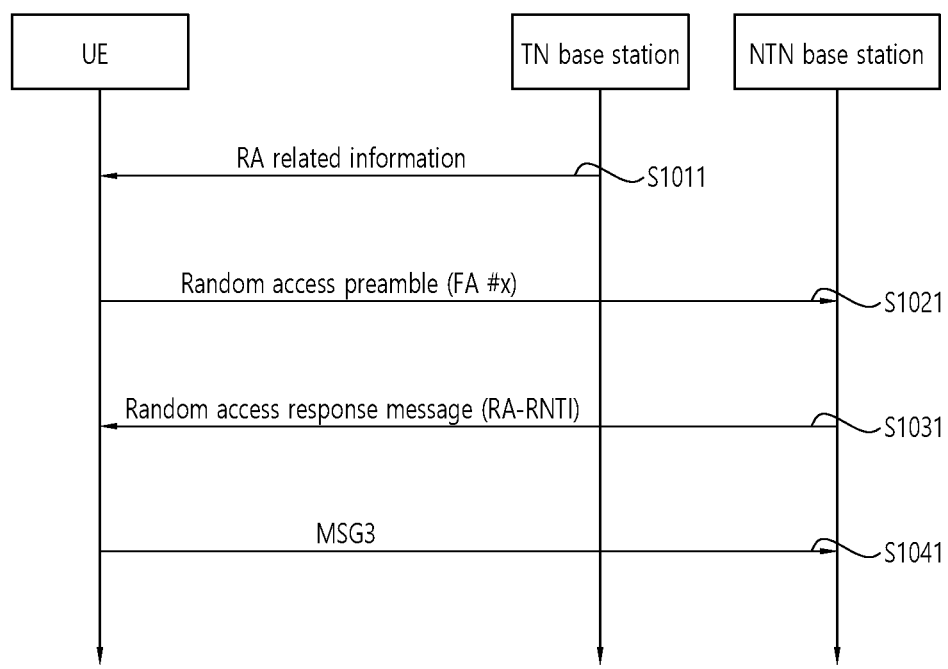
FIG. 10b is a flowchart for describing operations of a UE and a network node according to another embodiment.
Figure 10C:
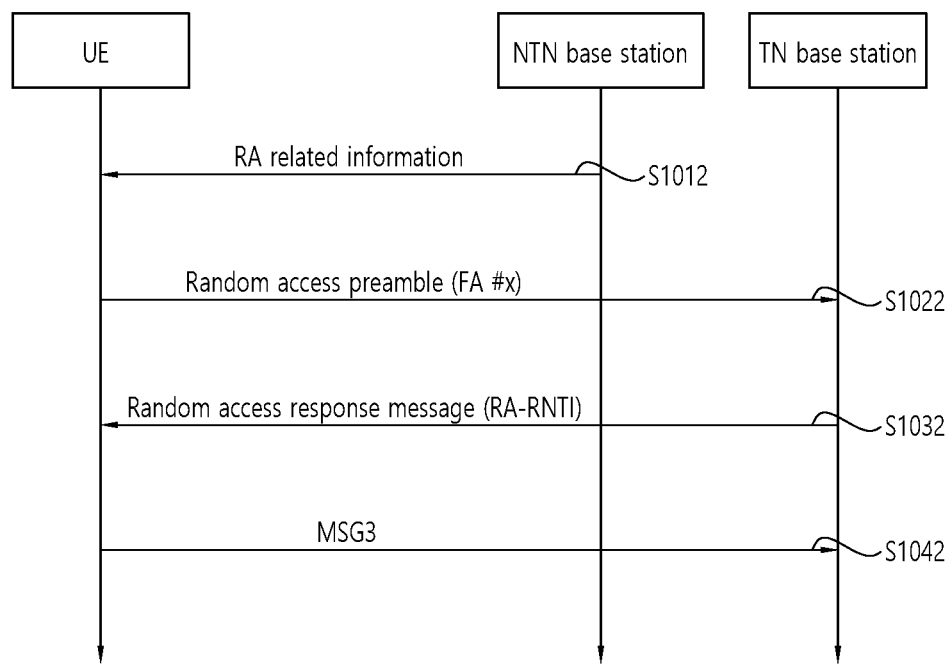
FIG. 10c is a flowchart for describing operations of a UE and a network node according to another embodiment.

FIG. 10b and FIG. 10c are flowcharts for describing operations of a UE and a network node according to another embodiment. FIG. 10b and FIG. 10c show a random access related procedure or signaling in which a TN and an NTN are associated in an environment in which a TN cell and an NTN cell at least partially overlap (e.g., a TN and NTN dual connectivity (DC) situation or a TN to NTN coverage handover situation).

Various DC scenarios are possible in the present description. As an example, DC may include a case in which a TN base station provides a TN cell as a master node, and an NTN base station provides an NTN cell as a secondary node. As another example, DC may include a case in which an NTN base station provides an NTN cell as a master node, and a TN base station provides a TN cell as a secondary node.

In DC according to the present description, the coverage of an NTN cell may include the coverage of a TN cell or the coverages may partially overlap. In addition, in the present description, a TN base station may include an eNodeB supporting E-UTRA, and an NTN base station may include a gNodeB supporting NR.

Referring to FIG. 10b, the TN base station transmits RA related information on the NTN cell to a UE (S1011). Step S1011 may be performed, for example, in an environment in which the TN base station communicates with the UE in cooperation with an NTN base station that provides an NTN cell based on DC. In this case, the NTN cell may be adjacent to or include a TN cell. Alternatively, step S1011 may be performed, for example, in an environment in which the UE performs handover from the TN cell to the NTN cell.

In step S1011, the RA related information may be transmitted by being included in an RRC message or transmitted by being included in system information.

In step S1011, the UE receives the RA related information on the NTN cell from the TN base station. In a DC environment, the UE is connected to the TN base station and the NTN base station at the same time, but the RA related information on the NTN cell is received from the TN base station rather than the NTN base station. Alternatively, the UE may perform handover more easily by receiving the RA related information on the NTN cell from the TN base station in advance through an RRC message before handover from the TN cell to the NTN cell.

The RA related information may include a root sequence index field, a PRACH configuration index field, and a PRACH frequency offset field.

In one aspect, the RA related information may include a size (or the number of resource blocks) field of a frequency region allocated for random access preamble transmission.

In another aspect, the RA related information may further include information on enhanced PRACH frequency resources for the NTN cell.

In another aspect, it may further include information on mapping between a preamble group and an FA.

The UE transmits a random access preamble to the NTN base station using FA #x among PRACH frequency resources enhanced in the NTN cell (S1021). For example, the UE may perform a random access procedure in order to access the NTN cell after receiving the RA related information. In this case, the UE may select and transmit one of a predetermined number of preambles using the RA related information.

Thereafter, the UE and the NTN base station calculate an RA-RNTI according to Formula 2 above. Then, the NTN base station transmits a random access response message including response information to the random access preamble to the UE (S1031). For example, the UE monitors whether a random access response message is received within a random access response window set based on random access preamble transmission resource information. If a random access response message identified by a temporary identifier related to random access preamble transmission is received within the random access response window, the UE receives the random access response message.

Thereafter, the UE transmits MSG 3 including request information for requesting an RRC connection to the NTN base station (S1041). For example, MSG 3 may include information for requesting radio resource allocation required for uplink transmission.

Referring to FIG. 10c, the NTN base station transmits RA related information on the TN cell to the UE (S1012). Step S1012 may be performed, for example, in an environment in which the NTN base station communicates with the UE in cooperation with another TN base station that provides a TN cell based on DC. In this case, the NTN cell may be adjacent to or include the TN cell. Alternatively, step S1012 may be performed, for example, in an environment in which the UE performs handover from the NTN cell to the TN cell.

In step S1012, the RA related information may be transmitted by being included in an RRC message or transmitted by being included in system information.

In step S1012, the UE receives RA related information on the TN cell from the NTN base station. In a DC environment, the UE is connected to the NTN base station and the TN base station at the same time, but the RA related information on the TN cell is received from the NTN base station rather than the TN base station. Alternatively, the UE may perform handover more easily by receiving the RA related information on the TN cell from the NTN base station through an RRC message before handover from the NTN cell to the TN cell.

The RA related information may include a root sequence index field, a PRACH configuration index field, and a PRACH frequency offset field.

In one aspect, the RA related information may include a size (or the number of resource blocks) field of a frequency region allocated for random access preamble transmission.

In another aspect, the RA related information may further include information on PRACH frequency resources for the TN cell.

In another aspect, it may further include information on mapping between a preamble group and an FA.

The UE transmits a random access preamble to the TN base station using FA #x among PRACH frequency resources in the TN cell (S1022). For example, the UE may perform a random access procedure in order to access the TN cell after receiving the RA related information. In this case, the UE may select and transmit one of a predetermined number of preambles using the RA related information.

Thereafter, the UE and the TN base station calculate an RA-RNTI according to Formula 2 above. Then, the TN base station transmits a random access response message including response information to the random access preamble to the UE (S1032). For example, the UE monitors whether a random access response message is received within a random access response window set based on random access preamble transmission resource information. If a random access response message identified by a temporary identifier related to random access preamble transmission is received within the random access response window, the UE receives the random access response message.

Thereafter, the UE transmits MSG 3 including request information for requesting an RRC connection to the TN base station (S1042). For example, MSG 3 may include information for requesting radio resource allocation required for uplink transmission.

Network Slicing

Network slicing is a new concept applied to 5G mobile communications which provides network resources and network functions for each service by creating and providing end-to-end (E2E) resources spanning a radio access network (RAN) to a core network as one independent slice, thereby applying attributes such as isolation, customization, and independent management and orchestration to the RAN and the core network of mobile communications.

Communication technology is being developed in a way of being combined with the development of technologies such as network function virtualization (NFV) and a software defined network (SDN) to configure a network slice optimized for application characteristics for each application in one huge network.

Network slicing is technology for creating a logically separated network with end-to-end (E2E) in a UE including radio access, transmission, and 5G core equipment through one physical network and providing a dedicated network specialized for a service for various services having different characteristics. That is, the network slicing is technology for providing network resources and network functions necessary for a service requested by a UE by making them as one independent slice.

Figure 11:
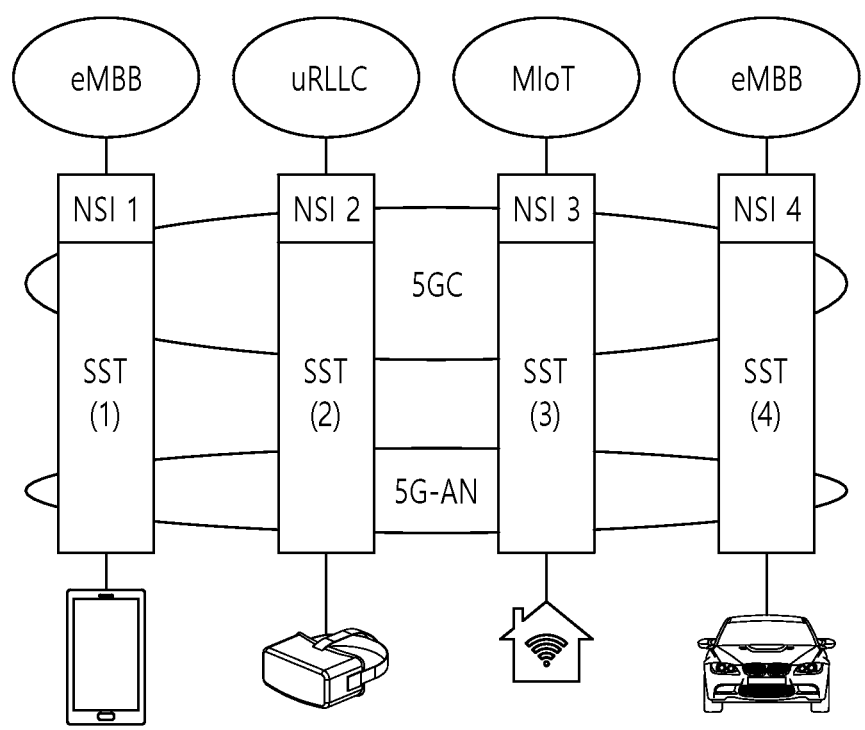
FIG. 11 shows a UE and a network node in which an embodiment of the present invention is implemented.

FIG. 11 is a diagram for describing a concept of a network slice according to an embodiment.

Referring to FIG. 11, one network slice is composed of an E2E logical network including a UE and a counterpart node (a counterpart UE or a counterpart application server). A user may access a network slice specialized for an application (eMBB, URLLC, MIoT, V2X, or the like) used by the user and receive a service. That is, the UE of the user may simultaneously access one or more network slices. Each slice may be identified by a slice/service type (SST) mapped to an expected network operation in terms of services and characteristics.

A mobile communication operator may allocate a network resource suitable for a corresponding service for each slice or for each set of a specific slice. The network resource may refer to a logical resource or radio resource allocation provided by a network function (NF). A network slice instance (NSI) may be defined as a set of network function instances and required resources forming a deployed network slice.

In describing the embodiments of the present disclosure, a slice, a service, a network slice, a network service, an application slice, an application service, and the like may be interchangeably used.

Random Access Procedure in Network Slicing

For uplink synchronization setup in NR, a UE transmits a random access preamble for a corresponding RACH occasion (RO) to a network node, and the network node may receive the random access preamble and then use the same for synchronization with the UE through timing advance (TA) estimation. The UE transmits the random access preamble at different times according to a delay time difference between the UE and the network node, and various random access preamble formats and random access preamble monitoring periods according to various scenarios are set such that the network node detects a plurality of random access preambles.

When network slicing is applied, a mobile communication operator may allocate a network resource suitable for a corresponding service for each slice or for each set of a specific slice, and the UE may access one or more slices. To this end, the UE may perform a random access procedure for each independent slice. RAN slices constituting end-to-end (E2E) network slicing may be separately provided through division of a frequency band (e.g., 3.5 GHz or 28 GHz) and/or time, and different frequency resources may be allocated for a random access procedure for the respective slices. Here, since respective slices or services provided for the respective slices have different requirements for the random access procedure, a method of giving priority for the random access procedure is required.

Slice-Based Frequency Resource Allocation

An embodiment includes a method of differently allocating radio resources for random access according to each slice or service. Here, radio resources may include time or frequency resources. For example, frequency resources for random access may be logically divided and operated for individual slices by giving priority to each slice. Alternatively, frequency resources for random access may be logically divided and operated for respective services (e.g., eMBB, URLLC, mMTC, C-V2X, etc.) by giving priority to each service. To this end, information indicating random access or a PRACH resource to which each slice is mapped or allocated may be transmitted from a network node to a UE. Alternatively, a communication system may be designed such that fixed or designated random access or PRACH resources are present for each slice. In this case, UEs and network nodes may perform random access based on a specific random access resource set in a specific slice without additional signaling.

In one aspect, different random access preambles may be used for respective RAN slices (or for respective services such as eMBB, URLLC, mMTC, and C-V2X). That is, random access preambles used for the respective RAN slices or services may be distinguished from each other, and thus the priority for the random access procedure may be adjusted. For example, it is possible to set a high priority for random access attempted in a RAN slice used for URLLC.

In one aspect, frequency and/or time resources may be separately configured for each random access preamble. Accordingly, a priority for a random access procedure set differently for each slice or service may be applied. In this regard, it should be noted that allocation of different frequency and/or time resources for respective random access preambles may be applied even when RAN slices are not applied.

In one aspect, a random access transmission power offset (RA Tx power offset) value may be separately applied for each slice. Random access transmission power may be determined by applying a preset offset value to received synchronization signal block (SSB) power. According to an aspect of the present invention, a priority may be applied when a random access procedure is attempted for each slice or service by applying different random access transmission power offset values for respective slices. For example, a random access procedure can be attempted with higher transmission power (Tx power) for a URLLC service or a URLLC slice when RAN slicing is applied, thereby improving the probability of success of the random access procedure. Furthermore, it is possible to more efficiently achieve low latency for the URLLC service. Further, a lower random access transmission power offset may be set for eMBB or mMTC in which the need for relatively rapid access is alleviated as compared to URLLC service.

Meanwhile, since various services can be simultaneously applied to one UE as described above, different random access related parameters may be set for respective RAN slices according to an aspect of the present invention. Here, it is noted that different parameters may be set for respective slices or services in not only the random access procedure but also other communication procedures.

In one aspect, RAN slicing related information needs to be transmitted to a UE. The RAN slicing related information may be delivered from a network node to the UE in the form of, for example, system information, an RRC message, a MAC control element (CE), downlink control information (DCI), or the like.

In one aspect, when RAN slicing is applied, frequency and time resources for random access may be separately used for each slice. In particular, if frequency resources are set using, for example, msg1-FDM and msg1-FrequencyStart values included in PRACH configuration information, different msg1-FDM and msg1-FrequencyStart values may be set for respective slices. Accordingly, the msg1-FDM and msg1-FrequencyStart values may be delivered to the UE through system information or an RRC message for each slice, and control signaling such as MAC CE and DCI. Time resources allocated for random access may also be separately set for each slice. For example, random access resources for URLLC may be set in a shorter period than other services in time.

Although the above embodiments have been described focusing on application of a network slicing-based network for each slice for convenience of description, it is noted that a network slicing-based network may be applied differently for each random access preamble on a network in which network sliding is not implemented or may be applied differently for each service (e.g., eMBB, URLLC, mMTC, C-V2X, or the like) even if it is not specified otherwise. For example, there may be a case in which RAN slicing is applied to a specific base station and RAN slicing is not applied to a specific base station. Here, in the case of applying RAN slicing, the above-described embodiments may be applied for each RAN slice, and when RAN slicing is not applied, the random access procedure is processed differently by applying the above-described embodiments for respective services, for example, thereby setting the priority for the random access procedure for each slice or for each service.

Meanwhile, in a mobile communication system such as LTE or 5G system, for example, a UE performing handover may perform contention-free based random access. In one aspect, RAN slicing may be applied to both a serving cell and a target cell between which handover is performed. Here, when handover from the serving cell to which RAN slicing is applied to the target cell to which RAN slicing is applied is performed and thus the UE performs contention-free based random access in the target cell, information on RAN slices may be included in handover parameters. Accordingly, the UE that has performed the handover can be stably and rapidly connected to the target cell. Here, the information on the RAN slices may be included in a handover message.

According to one aspect, RAN slicing may be applied to any one of a serving cell and a target cell between which handover is performed. Accordingly, handover may be performed from a cell to which RAN slicing is applied to a cell to which RAN slicing is not applied, or handover may be performed from a cell to which RAN slicing is not applied to a cell to which RAN slicing is applied. In this case, information related to RAN slices may also be included in the handover message, and the information related to the RAN slices may be considered for a contention-free based random access procedure. To this end, information on whether or not RAN slicing is applied to a specific cell may be delivered to a UE through, for example, system information, an RRC message, or control signaling such as MAC CE and DCI.

In one aspect, random access backoff (RA backoff) time may be set differently for each slice (or for each service). Here, the RA backoff time means a waiting time until a UE retry random access when the UE has failed in attempt to perform random access. As an example, the RA backoff time for the URLLC service (or URLLC slice) may be set to be shorter than the RA backoff time for the eMBB service (or eMBB slice) or the RA backoff time for the mMTC (or massive IoT) service (or mMTC slice). As another example, the RA backoff time for the mMTC (or massive IoT) service (or mMTC slice) may be set to be longer than the RA backoff time for the eMBB service (or eMBB slice). That is, a UE may attempt to perform a random access procedure based on a shorter RA backoff time for a high-priority URLLC service (URLLC slicing), thereby improving the probability of success of the random access procedure for the URLLC service.

Figure 12:
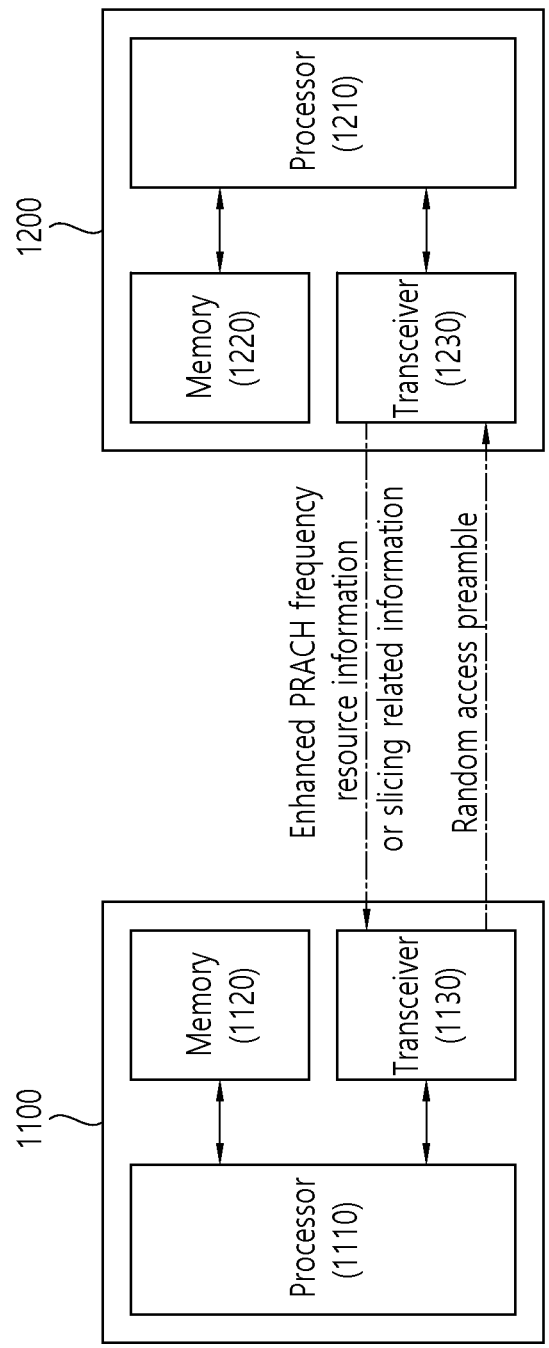
FIG. 12 is a diagram for describing the concept of a network slice according to an embodiment.

FIG. 12 shows a UE and a network node in which an embodiment of the present invention is implemented.

Referring to FIG. 12, the UE 1100 includes a processor 1110, a memory 1120, and a transceiver 1130. The processor 1110 may be configured to implement the functions, processes, and/or methods described in the present description. Layers of a radio interface protocol may be implemented in the processor 1110.

The processor 1110 may be configured to implement the functions, processes and/or methods of UEs described in the present description. Layers of a radio interface protocol for UEs described in the present description may be implemented in the processor 1110.

The memory 1120 is connected to the processor 1110 and stores various types of information for driving the processor 1110. The transceiver 1130 is connected to the processor 1110 to transmit a radio signal to the network node 1200 or receive a radio signal from the network node 1200.

The network node 1200 includes a processor 1210, a memory 1220, and a transceiver 1230. In the present embodiment, the network node 1200 is a node of a non-terrestrial network and may include an artificial satellite that performs the radio access procedure according to the present description. Alternatively, in the present embodiment, the network node 1200 is a node of a terrestrial network and may include a base station that performs the radio access procedure according to the present description.

The processor 1210 may be configured to implement the functions, processes and/or methods of network nodes or base stations described in the present description. Layers of a radio interface protocol for network nodes or base stations described in the present description may be implemented in the processor 1210. The memory 1220 is connected to the processor 1210 and stores various types of information for driving the processor 1210. The transceiver 1230 is connected to the processor 1210 to transmit a radio signal to the UE 1100 or receive a radio signal from the UE 1100.

The processors 1110 and 1210 may include an application-specific integrated circuit (ASIC), other chipsets, a logic circuit, and/or a data processing device. The memories 1120 and 1220 may include a read-only memory (ROM), a random access memory (RAM), a flash memory, a memory card, storage media, and/or other storage devices. The transceivers 1130 and 1230 may include a baseband circuit for processing radio frequency signals. When embodiments are implemented in software, the above-described technique may be implemented as modules (processes, functions, etc.) that perform the above-described functions. The modules may be stored in the memories 1120 and 1220 and executed by the processors 1110 and 1210. The memories 1120 and 1220 may be present inside or outside the processors 1110 and 1210 and may be connected to the processors 1110 and 1210 by various well-known means.

In the above-described exemplary system, the above-described methods that can be implemented according to the features of the present invention have been described on the basis of flowcharts. For convenience, the methods have been described as a series of steps or blocks, but the claimed features of the invention are not limited to the order of steps or blocks, and some steps may be performed in a different order or concurrently with other steps. In addition, those skilled in the art will understand that the steps shown in the flowcharts are not exclusive and that other steps may be included or one or more steps of the flowcharts may be deleted without affecting the scope of the present invention.

What is claimed is:

1. A method for performing a random access based on a network slicing of a user equipment (UE), the method comprising:
receiving information on a random access resource and slicing-related information which sets a parameter related to a random access priority through system information or a radio resource control (RRC) message from a base station; and
performing a random access procedure for the base station based on the information on a random access resource and the slicing-related information,
wherein the parameter related to a random access priority is set slice set-specifically, and
wherein the parameter related to a random access priority includes a parameter for a random access backoff value and a parameter for a random access transmit power offset value.

2. The method of claim 1, wherein a random access transmit power offset value of a network slice dedicated to Ultra Reliable and Low Latency Communications (URLLC) services is greater than a random access transmit power offset value of a network slice which is not dedicated to the URLLC services.

3. The method of claim 1, wherein the information on the random access resource includes a msg1-FDM parameter and a msg1-FrequencyStart parameter, and
wherein the msg1-FDM parameter and the msg1-FrequencyStart parameter are set individually for each slice set.

4. The method of claim 1, wherein when the UE performs a handover from a serving cell to a target cell, the random access procedure is performed on a contention-free basis.

5. The method of claim 4, wherein a handover-related message of the base station includes at least part of the slicing-related information.

6. The method of claim 1, wherein a handover-related message of the base station includes information on whether network slicing is applied.

7. A method for performing a random access based on a network slicing of a base station, the method comprising:
transmitting information on a random access resource and slicing-related information which sets a parameter related to a random access priority through system information or a radio resource control (RRC) message to a user equipment (UE); and
performing a random access procedure with the UE based on the information on a random access resource and the slicing-related information,
wherein the parameter related to a random access priority is set slice set-specifically, and
wherein the parameter related to a random access priority includes a parameter for a random access backoff value and a parameter for a random access transmit power offset value.

8. The method of claim 7, wherein a random access transmit power offset value of a network slice dedicated to Ultra Reliable and Low Latency Communications (URLLC) services is greater than a random access transmit power offset value of a network slice which is not dedicated to the URLLC services.

9. The method of claim 7, wherein the information on the random access resource includes a msg1-FDM parameter and a msg1-FrequencyStart parameter, and
wherein the msg1-FDM parameter and the msg1-FrequencyStart parameter are set individually for each slice set.

10. The method of claim 7, wherein when the UE performs a handover from a serving cell to a target cell, the random access procedure is performed on a contention-free basis.

11. The method of claim 10, wherein a handover-related message of the base station includes at least part of the slicing-related information.

12. The method of claim 10, wherein the handover-related message of the base station includes information on whether network slicing is applied.

13. A user equipment (UE) performing a random access based on a network slicing, the UE comprising:
a transceiver receiving information on a random access resource and slicing-related information which sets a parameter related to a random access priority through system information or a radio resource control (RRC) message from a base station, and performing a random access procedure for the base station based on the information on a random access resource and the slicing-related information; and
a processor generating a random access preamble used for the random access procedure,
wherein the parameter related to a random access priority is set slice set-specifically, and
wherein the parameter related to a random access priority includes a parameter for a random access backoff value and a parameter for a random access transmit power offset value.

14. A base station performing a random access based on a network slicing, the base station comprising:
a transceiver transmitting information on a random access resource and slicing-related information which sets a parameter related to a random access priority through system information or a radio resource control (RRC) message to a user equipment (UE), and performing a random access procedure with the UE based on the information on a random access resource and the slicing-related information; and
a processor generating a random access response message used for the random access procedure,
wherein the parameter related to a random access priority is set slice set-specifically, and
wherein the parameter related to a random access priority includes a parameter for a random access backoff value and a parameter for a random access transmit power offset value.

* * * * *